United States Patent
Okada et al.

(10) Patent No.: US 12,270,685 B2
(45) Date of Patent: Apr. 8, 2025

(54) CALIBRATION APPARATUS, CALIBRATION METHOD, AND RECORDING MEDIUM HAVING RECORDED THEREON CALIBRATION PROGRAM

(71) Applicant: Asahi Kasei Microdevices Corporation, Tokyo (JP)

(72) Inventors: Keita Okada, Tokyo (JP); Takahito Hara, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 347 days.

(21) Appl. No.: 17/876,592

(22) Filed: Jul. 29, 2022

(65) Prior Publication Data

US 2023/0067921 A1 Mar. 2, 2023

(30) Foreign Application Priority Data

Aug. 26, 2021 (JP) ................................. 2021-138400

(51) Int. Cl.
| | |
|---|---|
| *G01D 18/00* | (2006.01) |
| *G01D 5/244* | (2006.01) |
| *G03B 13/36* | (2021.01) |

(52) U.S. Cl.
CPC ........... *G01D 18/001* (2021.05); *G01D 5/244* (2013.01); *G03B 13/36* (2013.01)

(58) Field of Classification Search
CPC .............. H02P 8/30; H02P 21/18; H02P 6/006
USPC .......................................................... 318/687
See application file for complete search history.

(56) References Cited

U.S. PATENT DOCUMENTS

| | | | |
|---|---|---|---|
| 10,749,452 B2 | 8/2020 | Kaidu | |
| 11,039,071 B2 | 6/2021 | Min | |
| 2009/0085558 A1 | 4/2009 | David | |
| 2009/0224716 A1* | 9/2009 | Vig | ........................ G05B 19/19 |
| | | | 318/550 |
| 2011/0291603 A1 | 12/2011 | Kura | |
| 2012/0191889 A1 | 7/2012 | Fischer | |
| 2015/0130388 A1* | 5/2015 | Fukushima | .............. H02P 25/06 |
| | | | 318/632 |
| 2015/0350507 A1 | 12/2015 | Topliss | |

(Continued)

FOREIGN PATENT DOCUMENTS

| | | |
|---|---|---|
| JP | 05064487 A * | 3/1993 |
| JP | H0564487 A | 3/1993 |

(Continued)

*Primary Examiner* — Kawing Chan

(57) ABSTRACT

Provided is a calibration apparatus comprising: a driving control unit to drive an object provided with a lens in a movable range for moving the object in an optical axis-direction by sequentially controlling a plurality of drive units configured to drive the object within each of a plurality of sections into which the movable range is divided, in calibration of a drive apparatus including: the plurality of drive units; and a magnetic field detection unit configured to detect a magnetic field corresponding to a position of the object; a position acquisition unit to acquire position data of the object; a magnetic field acquisition unit to acquire magnetic field data corresponding to a position of the object; and a generating unit to generate, based on the position data and the magnetic field data, end point information to determine a driving range in each of the plurality of sections.

20 Claims, 14 Drawing Sheets

(56) References Cited

U.S. PATENT DOCUMENTS

2016/0033739 A1    2/2016  Topliss
2016/0295099 A1   10/2016  Kasamatsu
2018/0109207 A1*   4/2018  Oka .................... B30B 15/0094

FOREIGN PATENT DOCUMENTS

| JP | H09191680  | A |   | 7/1997  |
|----|------------|---|---|---------|
| JP | 2005049729 | A |   | 2/2005  |
| JP | 2007124799 | A |   | 5/2007  |
| JP | 2008035130 | A | * | 2/2008  |
| JP | 2013011749 | A | * | 1/2013  |
| JP | 2013099139 | A |   | 5/2013  |
| JP | 2013238821 | A |   | 11/2013 |
| JP |    5731950 | B2|   | 6/2015  |
| JP | 2017097787 | A |   | 6/2017  |
| JP |    6644529 | B2|   | 2/2020  |

\* cited by examiner

| INDEX | SECTION | RESPONSIBLE DRIVE UNIT | APPLYING DIRECTION |
|---|---|---|---|
| 0 | 0-1mm | 60a | NON-INVERTED |
| 1 | 1-2mm | 60b | INVERTED |
| 2 | 2-3mm | 60a | INVERTED |
| 3 | 3-4mm | 60b | NON-INVERTED |
| 4 | 4-5mm | 60c | INVERTED |
| 5 | 5-6mm | 60b | INVERTED |
| 6 | 6-7mm | 60c | NON-INVERTED |
| 7 | 7-8mm | 60d | INVERTED |
| 8 | 8-9mm | 60c | INVERTED |
| 9 | 9-10mm | 60d | NON-INVERTED |

FIG.3

CALIBRATION APPARATUS, CALIBRATION METHOD, AND RECORDING MEDIUM HAVING RECORDED THEREON CALIBRATION PROGRAM

The contents of the following Japanese patent application(s) are incorporated herein by reference:
NO. 2021-138400 filed in JP on Aug. 26, 2021

BACKGROUND

1. Technical Field

The present invention relates to a calibration apparatus, a calibration method, and a recording medium having recorded thereon a calibration program.

2. Related Art

Patent document 1 discloses, "The present invention can output one end point moving signal which is different from the operation amount signal when synchronizing the position of the linear movement device and the output signal of the magnetic field sensor. The end point moving signal is configured to move the linear movement device from one end point to the other end point by adding forces toward one end point of a predetermined moving range of the linear movement device and forces toward the other end point alternately, and thus the speed of the linear movement device colliding with the end point can be suppressed, and collision noise of the linear movement device and the end point can be caused to be smaller."

PRIOR ART DOCUMENTS

Patent Documents

[Patent Document 1] U.S. Pat. No. 5,731,950
[Patent Document 2] U.S. Pat. No. 6,212,135
[Patent Document 3] U.S. Pat. No. 5,961,258

SUMMARY

In the first aspect of the present invention, a calibration apparatus is provided. The calibration apparatus may include a driving control unit configured to drive an object provided with a lens in a movable range for moving the object in an optical axis-direction by sequentially controlling a plurality of drive units configured to drive the object within each of a plurality of sections into which the movable range is divided, in calibration of a drive apparatus including: the plurality of drive units; and a magnetic field detection unit configured to detect a magnetic field corresponding to a position of the object. The calibration apparatus may include a position acquisition unit configured to acquire position data indicating data regarding a position of the object. The calibration apparatus may include a magnetic field acquisition unit configured to acquire magnetic field data indicating a magnetic field corresponding to a position of the object. The calibration apparatus may include a generating unit configured to generate, based on the position data and the magnetic field data, end point information indicating a value of the magnetic field data when the object is located at each of end points of the plurality of sections, to determine a driving range in each of the plurality of sections by using the end point information.

The driving control unit may control, in accordance with a position of the object, one drive unit responsible for a section in which the object is located among the plurality of drive units as a control target.

The calibration apparatus may further include a switch decision unit configured to decide a switch of the control target based on the position data The driving control unit may switch the control target based on a decision result of the switch decision unit.

The switch decision unit may decide a switch of the control target to a drive unit responsible for a next section when the object moved from an end to an opposite end in each section.

The switch decision unit may decide that the object has moved to the opposite end when the position data exceeds a prestored standard.

The magnetic field detection unit may include a plurality of magnetic sensors each of which is associated with one of the plurality of drive units. The magnetic field acquisition unit may acquire the magnetic field data from a magnetic sensor associated with the drive unit having become the control target.

The magnetic field acquisition unit may acquire the magnetic field data further from a magnetic sensor associated with the drive unit responsible for the next section.

Each of the plurality of magnetic sensors may be composed of a sensor element group consisting of a plurality of sensor elements. The magnetic field acquisition unit may acquire the magnetic field data from at least one sensor element of the plurality of sensor elements.

Each of the plurality of sensor elements may be arranged out of alignment with each other in an optical axis-direction and a direction crossing with the optical axis-direction.

The generating unit may generate the end point information by using a regression analysis using the position data and the magnetic field data.

The position acquisition unit may acquire, as the position data, at least one of measurement data of a measured position of the object or a magnetic field generated when the object moves.

The calibration apparatus may further include the drive apparatus.

Each of the plurality of drive units may include: a drive coil configured to drive a magnet provided for the object; and a driver configured to supply a drive current to the drive coil. The driving control unit may control the drive current to be supplied from the driver to the drive coil.

The driver may be capable of inverting a direction of the drive current to be supplied to the drive coil in response to a control command from the driving control unit.

The driving control unit may gradually increase a magnitude of the drive current when the driving control unit causes the object to move from an end to an opposite end in each section.

The driving control unit may gradually decrease a magnitude of the drive current when the driving control unit causes the object to move from an end to an opposite end in each section.

The calibration apparatus may further include an adjustment unit configured to adjust the end point information in response to feedback control having been executed based on the magnetic field data.

In the second aspect of the present invention, a calibration method is provided. The calibration method may include driving an object provided with a lens in a movable range for moving the object in an optical axis-direction by sequentially controlling a plurality of drive units configured to drive the object within each of a plurality of sections into which the movable range is divided, in calibration of a drive apparatus including: the plurality of drive units; and a magnetic field detection unit configured to detect a magnetic field corresponding to a position of the object. The calibration method may include acquiring position data indicating data regarding a position of the object. The calibration method may include acquiring magnetic field data indicating a magnetic field corresponding to a position of the object. The calibration method may include generating, based on the position data and the magnetic field data, end point information indicating a value of the magnetic field data when the object is located at each of end points of the plurality of sections, to determine a driving range in each of the plurality of sections by using the end point information.

In the third aspect of the present invention, a recording medium having recorded thereon a calibration program is provided. The calibration program may be executed by a computer. The calibration program may cause the computer to function as a driving control unit configured to drive an object provided with a lens in a movable range for moving the object in an optical axis-direction by sequentially controlling a plurality of drive units configured to drive the object within each of a plurality of sections into which the movable range is divided, in calibration of a drive apparatus including: the plurality of drive units; and a magnetic field detection unit configured to detect a magnetic field corresponding to a position of the object. The calibration program may cause the computer to function as a position acquisition unit configured to acquire position data indicating data regarding a position of the object. The calibration program may cause the computer to function as a magnetic field acquisition unit configured to acquire magnetic field data indicating a magnetic field corresponding to a position of the object. The calibration program may cause the computer to function as a generating unit configured to generate, based on the position data and the magnetic field data, end point information indicating a value of the magnetic field data when the object is located at each of end points of the plurality of sections, to determine a driving range in each of the plurality of sections by using the end point information.

The summary clause does not necessarily describe all necessary features of the embodiments of the present invention. The present invention may also be a sub-combination of the features described above.

BRIEF DESCRIPTION OF THE DRAWINGS

FIG. 3 shows an assignment example of drive units 60 responsible for each of a plurality of sections.

DESCRIPTION OF EXEMPLARY EMBODIMENTS

Hereinafter, the present invention will be described through embodiments of the invention, but the following embodiments do not limit the invention according to the claims. In addition, not all combinations of features described in the embodiments necessarily have to be essential to solving means of the invention.

Figure 1:
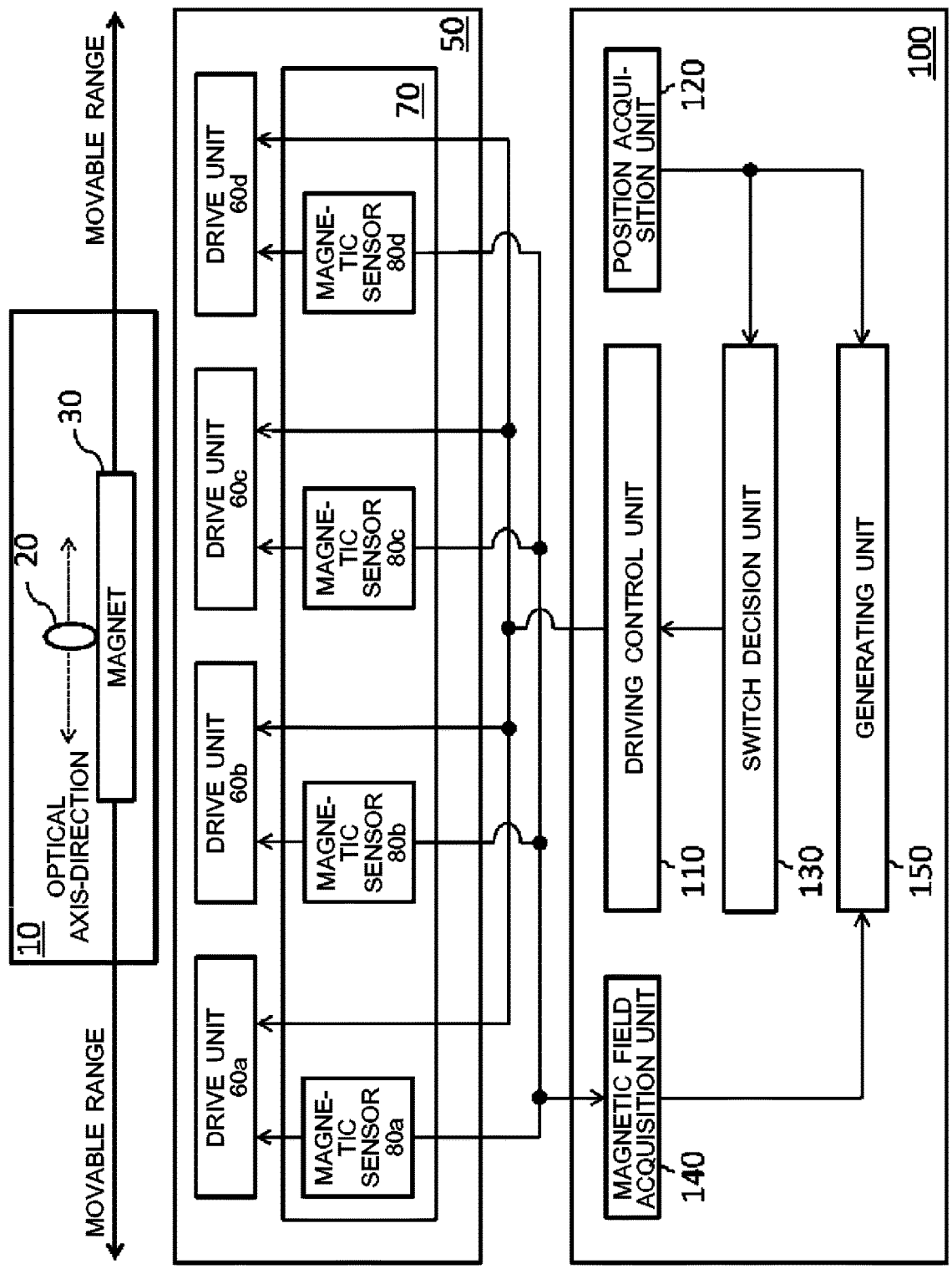
FIG. 1 shows an example of a block diagram of a calibration apparatus 100 according to the present embodiment together with an object 10 and a drive apparatus 50.

FIG. 1 shows an example of a block diagram of a calibration apparatus 100 according to the present embodiment together with an object 10 and a drive apparatus 50. The calibration apparatus 100 according to the present embodiment is configured to acquire position data and magnetic field data by performing open drive on the drive apparatus 50 when performing calibration on the drive apparatus 50 configured to drive the object 10. Based on the acquired data, the calibration apparatus 100 is configured to generate end point information for each of a plurality of sections into which a movable range of the object 10 is divided to determine a driving range.

The object 10 is a device the position of which varies according to an input signal. By way of example, the object 10 may be a linear movement device. In a linear movement device, an input signal and the displacement according to said input signal are represented by a linear function. Examples of such a linear movement device include an autofocus lens of a camera or the like. Hereinafter, a case where the object 10 is an autofocus lens of a camera is described by way of example. However, it is not limited thereto. The object 10 may be one of various devices the position of which varies according to an input signal. The object 10 is provided with a lens 20 and a magnet 30.

The lens 20 is an optical element for refracting and converging lights. By displacing such a lens 20 in an optical axis-direction, the focus is adjusted in autofocus control.

The magnet 30 is a permanent magnet fixed to the lens 20. By way of example, the S poles and the N poles of the magnet 30 may be arranged alternately along the optical axis-direction of the lens 20. In response to current flowing in a drive coil described below, a magnetic force is generated between the magnet 30 and the drive coil, enabling the lens 20 to be displaced in the optical axis-direction.

The drive apparatus 50 is configured to drive the object 10 in a movable range. Such a movable range may be a predetermined range for moving the object 10 provided with the lens 20 in the optical axis-direction. The drive apparatus 50 has a plurality of drive units 60a-d (which are collectively referred to as a "drive unit 60") and a magnetic field detection unit 70. Note that the drive apparatus 50 having four drive units 60a-b is shown as one example in the present drawing, but it is not limited thereto. The drive apparatus 50 may have a plurality of drive units 60, including two, three, or more than four drive units 60.

The plurality of drive units 60 are configured to drive the object 10 provided with a lens 20 within each of a plurality of sections into which the movable range for moving the object 10 in the optical axis-direction is divided. The plurality of drive units 60 are arranged along the optical axis-direction of the lens 20 provided for the object 10. In such a plurality of drive units 60, each of a plurality of sections into which the movable range is divided is pre-assigned to one drive unit 60 for driving the object 10 to be responsible for the section. Each drive unit 60 drives the object 10 in its responsible section, and thus the plurality of drive units 60 cooperatively drive the object 10 over the movable range. The details of the drive unit 60 will be specifically described below.

The magnetic field detection unit 70 is configured to detect a magnetic field corresponding to a position of the object 10. As described above, the object 10 is provided with the magnet 30. Accordingly, the magnetic field detection unit 70 can detect a magnetic field generated between the N poles and the S poles of the magnet 30 as a magnetic field corresponding to the position of the object 10. Note that such a magnetic field is sufficiently greater in relation to a magnetic field generated when a drive current flows in the drive coil described below.

The magnetic field detection unit 70 may include a plurality of magnetic sensors 80a-d (which are collectively referred to as a "magnetic sensor 80") that are associated with each of the plurality of drive units 60a-d. In the present drawing, the magnetic field detection unit 70 including the magnetic sensor 80a associated with the drive unit 60a, the magnetic sensor 80b associated with the drive unit 60b, the magnetic sensor 80c associated with the drive unit 60c, and the magnetic sensor 80d associated with the drive unit 60d is shown as one example. By way of example, such a magnetic sensor 80 may be a Hall sensor configured to sense the variation in an external magnetic field based on a generated electromotive force by applying the Hall effect. However, it is not limited thereto. The magnetic sensor 80 may be one of various sensors, or the combination of the various sensors, that can detect a magnetic field, such as a spin-valve magnetoresistance element (such as a GMR element or TMR element), having a resistance varying according to the variation in an external magnetic field. Note that when the magnetic field detection unit 70 include the plurality of magnetic sensors 80a-d respectively associated with the plurality of drive units 60a-d, the pairs of the drive unit 60a and the magnetic sensor 80a, the drive unit 60b and the magnetic sensor 80b, the drive unit 60c and the magnetic sensor 80c, and the drive unit 60d and the magnetic sensor 80d may each be configured as one package (such as one IC). This enables IC or the like to be divided into more than one (four in the example of the present drawing), and thus the flexibility in layout of the object 10 is improved. Also intervals between each magnetic sensor 80 can be taken widely, which enables the movable range of the object 10 to be enlarged. However, it is not limited thereto. All of the plurality of drive units 60a-d and the plurality of magnetic sensors 80a-d may also be configured as one package.

During operation, such a drive apparatus 50 drives the object 10 by performing close drive. When performing calibration prior to the operation of such a drive apparatus 50 or while temporarily suspending the operation, the calibration apparatus 100 according to the present embodiment is configured to acquire the position data and magnetic field data by performing open drive on the drive apparatus 50. Based on the acquired data, the calibration apparatus 100 is configured to generate end point information for each of the plurality of sections into which the movable range of the object 10 is divided to determine a driving range. Note that the term "close drive" described herein refers to driving the drive apparatus 50 by feedback control based on the detected magnetic field, and the term "open drive" refers to driving the drive apparatus 50 without involving said feedback control.

The calibration apparatus 100 may be a computer such as a personal computer (PC), a tablet computer, a smartphone, a workstation, a server computer, or a general purpose computer, or may be a computer system in which a plurality of computers are connected. Such a computer system is also a computer in a broad sense. In addition, the calibration apparatus 100 may also be implemented by one or more virtual computer environments executable in a computer. Alternatively, calibration apparatus 100 may be a dedicated computer designed for the calibration of the drive apparatus 50, or may be dedicated hardware implemented by dedicated circuitry. Also when the calibration apparatus 100 can be connected to the Internet, the calibration apparatus 100 may be implemented by a cloud computing.

The calibration apparatus 100 includes a driving control unit 110, a position acquisition unit 120, a switch decision unit 130, a magnetic field acquisition unit 140, and a generating unit 150. Note that these blocks are functional blocks that are each functionally separated, and may not be necessarily required to be matched with actual device configurations. In other words, in the present drawing, a unit shown by one block may not necessarily need to be configured by one device. Also, in the present drawing, units shown by separate blocks may not necessarily need to be configured by separate devices.

Note the calibration apparatus 100 and the drive apparatus 50 being independent from each other are shown by way of example in the present drawing, but it is not limited thereto. The calibration apparatus 100 and the drive apparatus 50 may be implemented as an integrated apparatus. In other words, the calibration apparatus 100 may further include a drive apparatus 50. In this way, the calibration apparatus 100 may provide the function of driving the object 10 and the function of performing a calibration by one apparatus.

The driving control unit 110 is configured to sequentially control, in the calibration of the drive apparatus 50, the plurality of drive units 60 to drive the object 10 in the movable range. Here, the driving control unit 110 may control one drive unit 60 among the plurality of drive units 60 as a control target. In other words, the driving control unit 110 as a master drive the object 10 over the movable range by controlling the plurality of drive units 60 as slaves while sequentially switching the drive unit 60 to be the control target.

The position acquisition unit 120 is configured to acquire position data indicating data regarding the position of the object 10. For example, the position acquisition unit 120 may acquire, as the position data, measurement data of the position of the object 10 measured by means of a laser displacement meter. However, it is not limited thereto. The position acquisition unit 120 may acquire, as position data, various data that may indicate the position of the object 10. This will be described below. The position acquisition unit 120 is configured to supply the acquired position data to the switch decision unit 130 and the generating unit 150.

The switch decision unit 130 is configured to decide a switch of the control target based on the position data acquired by the position acquisition unit 120. For example, the switch decision unit 130 may decide the switch of the control target to a drive unit 60 responsible for a next section when the object 10 moved from an end to an opposite end in each section. The switch decision unit 130 is configured to supply, to the driving control unit 110, a trigger signal indicating the switch of the control target. In response, the driving control unit 110 is configured to switch the control target from the drive unit 60 responsible for the current section to the drive unit 60 responsible for the next section. In this manner, for example, the driving control unit 110, in accordance with the position of the object 10, controls one drive unit 60 responsible for a section at which the object 10 is located among the plurality of drive units 60 as a control target by switching the control target based on the decision result of the switch decision unit 130.

The magnetic field acquisition unit 140 is configured to acquire a magnetic field data indicating magnetic field corresponding to the position of the object 10. For example, the magnetic field acquisition unit 140 may acquire such magnetic field data from the magnetic sensor 80 associated with the drive unit 60 having become the control target. However, it is not limited thereto. The magnetic field acquisition unit 140 may acquire magnetic field data further from the magnetic sensor 80 associated with a drive unit 60 other than the one having become the control target. This will be described below. The magnetic field acquisition unit 140 is configured to supply the acquired magnetic field data to the generating unit 150.

The generating unit 150 is configured to generate, based on the position data acquired by the position acquisition unit 120 and the magnetic field data acquired by the magnetic field acquisition unit 140, end point information indicating a value of the magnetic field data when the object 10 is located at each of end points of the plurality of sections. Here, the generating unit 150 may generate the end point information by using a regression analysis using the position data and the magnetic field data. By using the generated end point information, the generating unit 150 is configured to determine a driving range in each of the plurality of sections. This will be described in detail.

Figure 2:
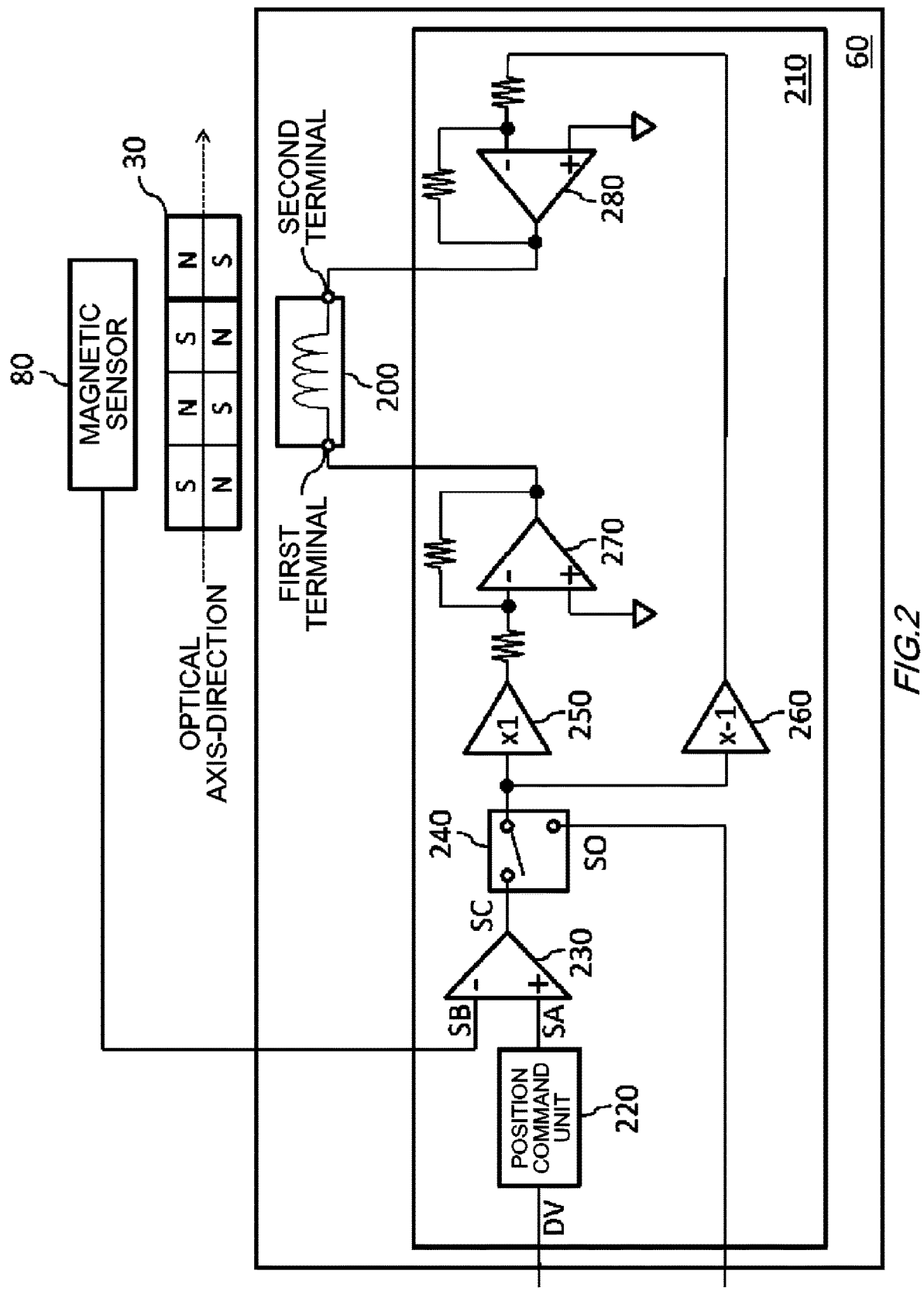
FIG. 2 shows a configuration example of a drive unit 60 together with a magnet 30 and a magnetic sensor 80.

FIG. 2 shows a configuration example of a drive unit 60 together with a magnet 30 and a magnetic sensor 80. Each of the plurality of drive units 60 includes a drive coil 200 and a driver 210.

The drive coil 200 is configured to drive the magnet 30 provided with the object 10. The drive coil 200 is wound along the optical axis-direction of the lens 20 provided for the object 10 and has the first terminal on an end of the optical axis-direction and the second terminal on the opposite end. When drive current is supplied from the driver 210, the drive coil 200 generates a magnetic field corresponding to said drive current. Here, the magnetic field is generated in an opposite direction depending on whether the drive current having flowed from the first terminal to the second terminal or the drive current having flowed from the second terminal to the first terminal. Thus, the drive coil 200 can drive the object 10 provided with the magnet 30 backward and forward along the optical axis-direction.

The driver 210 is configured to supply drive current to the drive coil 200. The driver 210 may include a position command unit 220, a differential amplifier 230, a switch 240, the first buffer 250, the second buffer 260, the first output driver 270, and the second output driver 280.

The position command unit 220 is configured to output a position command signal SA by converting a goal position signal DV supplied from the outside into a signal having been synchronized with a magnetic field signal SB which is based on the magnetic field detected by the magnetic sensor 80.

The position command signal SA is input into the non-inverted input terminal of the differential amplifier 230. Also the magnetic field signal SB is input into the inverted input terminal of the differential amplifier 230. The differential amplifier 230 is configured to output an operation amount signal SC indicating the operation amount corresponding to the position command signal SA and the magnetic field signal SB.

The operation amount signal SC is input into the first terminal of the switch 240. The open control signal SO supplied from the outside is input into the second terminal of the switch 240. The switch 240 is configured to switch whether to connect the third terminal to the first terminal or to the second terminal. In other words, the switch 240 switches whether to supply the operation amount signal SC or the open control signal SO to the downstream block. Switching this switch 240 allows switching whether to perform the close drive by the feedback control based on the detected magnetic field or perform the open drive not involving said feedback control.

The third terminal of the switch 240 is connected to the input terminals of the first buffer 250 and the second buffer 260. The first buffer 250 and the second buffer 260 are configured to correct and output the input voltage which has been decreased by an electrical resistance. Here, each of the first buffer 250 and the second buffer 260 is configured to output a signal having different polarities. These first buffer 250 and second buffer 260 are configured to be capable of inverting the sign by a setting change. Thus, the driver 210 is capable of inverting, for example, the direction of the drive current to be supplied to the drive coil 200 in response to a control command from the driving control unit 110.

The first output driver 270 and the second output driver 280 are configured to drive the input signal and supply the drive current to the drive coil 200. The output of the first output driver 270 is connected to the first terminal of the drive coil 200. The output of the second output driver 280 is connected to the second terminal of the drive coil 200.

During the operation, the switch 240 connects the third terminal to the first terminal. The magnetic field signal SB from the magnetic sensor 80 varies in accordance with the move of the magnet 30. Accordingly, the driver 210 recognizes the position of the object 10 based on the variation in the magnetic field signal SB, and the feedback control is performed such that the recognized position matches the goal position. In other words, the drive unit 60 is configured to drive the object 10 by the close drive. Meanwhile, during the calibration, the switch 240 is configured to connect the third terminal to the second terminal. Accordingly, the driver 210 is controlled in accordance with the open control signal SO. In other words, the drive unit 60 is configured to drive the object 10 by the open drive.

In such configurations, for example, the driver 210 is configured to supply the drive current to the drive coil 200 during the operation and during the calibration. Accordingly, the driving control unit 110 can drive the object 10 by controlling the drive current supplied from such a driver 210 to the drive coil 200.

When the position command unit 220 converts the goal position signal DV into the position command signal SA, it is important that the position of the object 10 and the detected magnetic field are synchronized with a high precision. In order to support such synchronization, for example, the calibration apparatus 100 according to the present embodiment determines a driving range by generating end point information on each of the plurality of sections. Note that a case where the position command unit 220 is included in the driver 210 is shown as one example in the foregoing description, but it is not limited thereto. The position command unit 220 may be included in any block in the drive apparatus 50 or the drive unit 60, or may be included in any block in the calibration apparatus 100.

FIG. 3 shows an assignment example of drive units 60 responsible for each of a plurality of sections. In the present drawing, a case where the position of the object at an end of the movable range is 0 mm and the position of the object at the opposite end is 10 mm and the movable range is divided into ten sections for every 1 mm is shown by way of example. By way of example, a section 0 is assigned to the drive unit 60a being responsible for the section, and the drive unit 60a drives the object 10 to the position from 0 mm to 1 mm by applying the drive current to a drive coil 200a included in the drive unit 60a in a non-inverted direction. Note that the non-inverted direction herein is an applying direction from the first terminal to the second terminal. In the same way, a section 1 is assigned to the drive unit 60b to be responsible for the section, and the drive unit 60b drives the object 10 to the position from 1 mm to 2 mm by applying the drive current to a drive coil 200b included in the drive unit 60b in a inverted direction. Note that the inverted direction herein is an applying direction from the second terminal to the first terminal. The same applies to other sections. In this manner, in the plurality of drive units 60, each of a plurality of sections into which a movable range is divided may be pre-assigned to one drive unit 60 for driving the object 10 to be responsible for the section.

Figure 4:
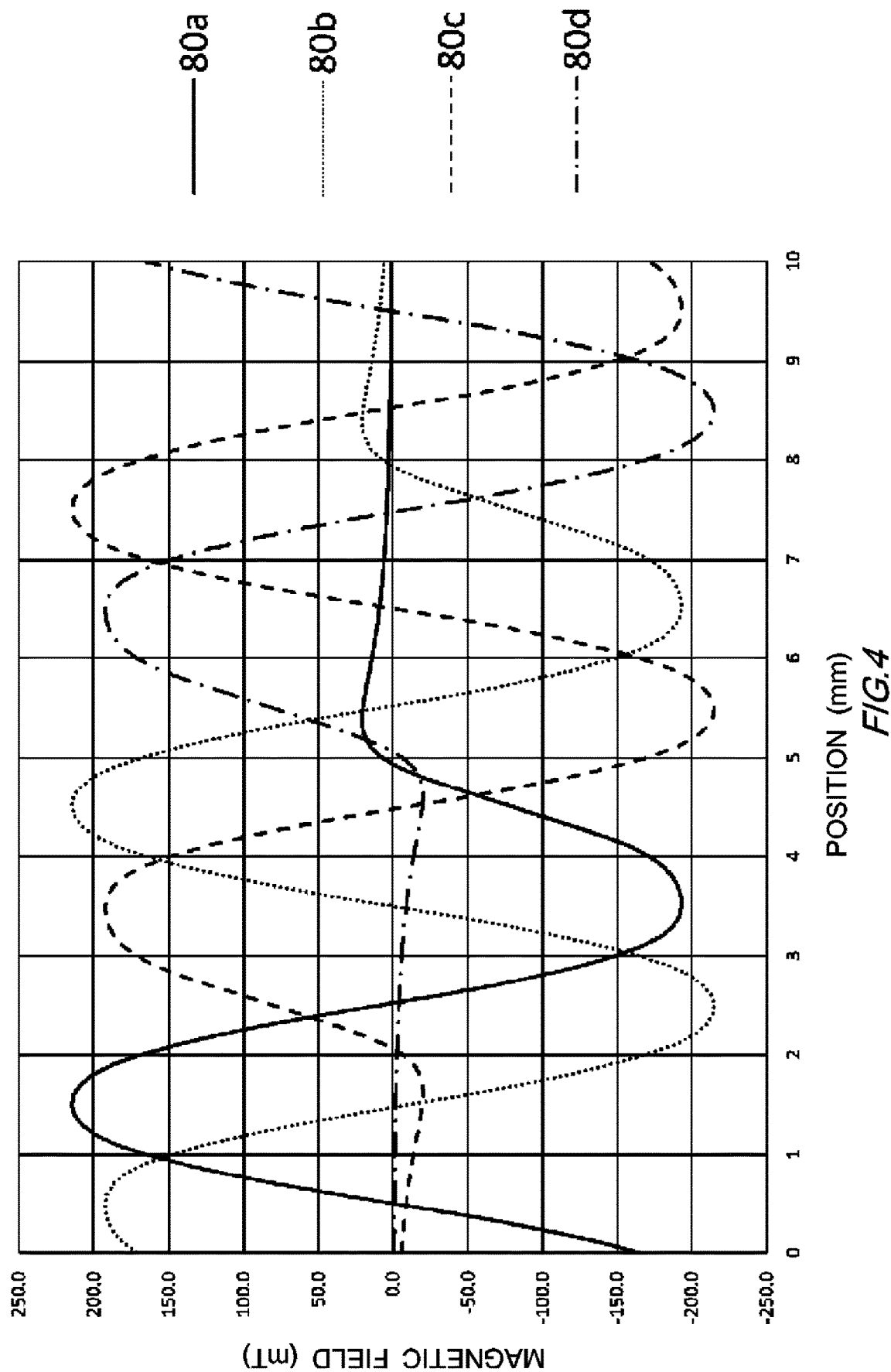
FIG. 4 shows an example of a simulation result of a magnetic field detected when the object 10 is driven in a movable range.

FIG. 4 shows an example of a simulation result of a magnetic field detected when the object 10 is driven in a movable range. In the present drawing, the horizontal axis represents the position of the object 10 by the unit [mm]. In the present drawing, the vertical axis represents the simulation result of the detected magnetic field by the unit [mT]. In the present drawing, the solid line shows the simulation result of the magnetic field detected by the magnetic sensor 80a associated with the drive unit 60a. In the present drawing, the dotted line shows the simulation result of the magnetic field detected by the magnetic sensor 80b associated with the drive unit 60b. In the present drawing, the dashed line shows the simulation result of the magnetic field detected by the magnetic sensor 80c associated with the drive unit 60c. In the present drawing, the long dashed dotted line shows the simulation result of the magnetic field detected by the magnetic sensor 80d associated with the drive unit 60d.

As shown in the present drawing, it is preferable that magnetic fields when the object 10 is located at an end and an opposite of each section can be detected accurately by the magnetic sensor 80 associated with the drive unit 60 responsible for each section when driving the object 10 in each section. However, due to the interval of sampling the magnetic field data or the timing of switching the drive unit 60, loss of the magnetic field data is generated. Thus, the value of the magnetic field when the object 10 is located at the end point of each section cannot be recognized accurately. In other words, the end point information cannot be obtained. Therefore, the driving range in each section cannot be determined by using the end point information.

It may be considered that if the drive unit 60 configured to drive the object 10 is one, the end point information can be obtained by causing the object 10 to mechanically contact with the end point. However, when the object 10 is driven for a long distance while the plurality of drive units 60 are sequentially switched, the end point information on each section cannot be obtained by mechanical contact.

Therefore, the calibration apparatus 100 according to the present embodiment is configured to acquire the position data and the magnetic field data by performing the open drive on the drive apparatus 50 when performing the calibration of the drive apparatus 50 configured to drive the object 10. Based on the acquired data, the calibration apparatus 100 is configured to generate end point information for each of a plurality of sections into which a movable range of the object 10 is divided to determine a driving range. This will be described in detail by using a flow of operations.

Figure 5:
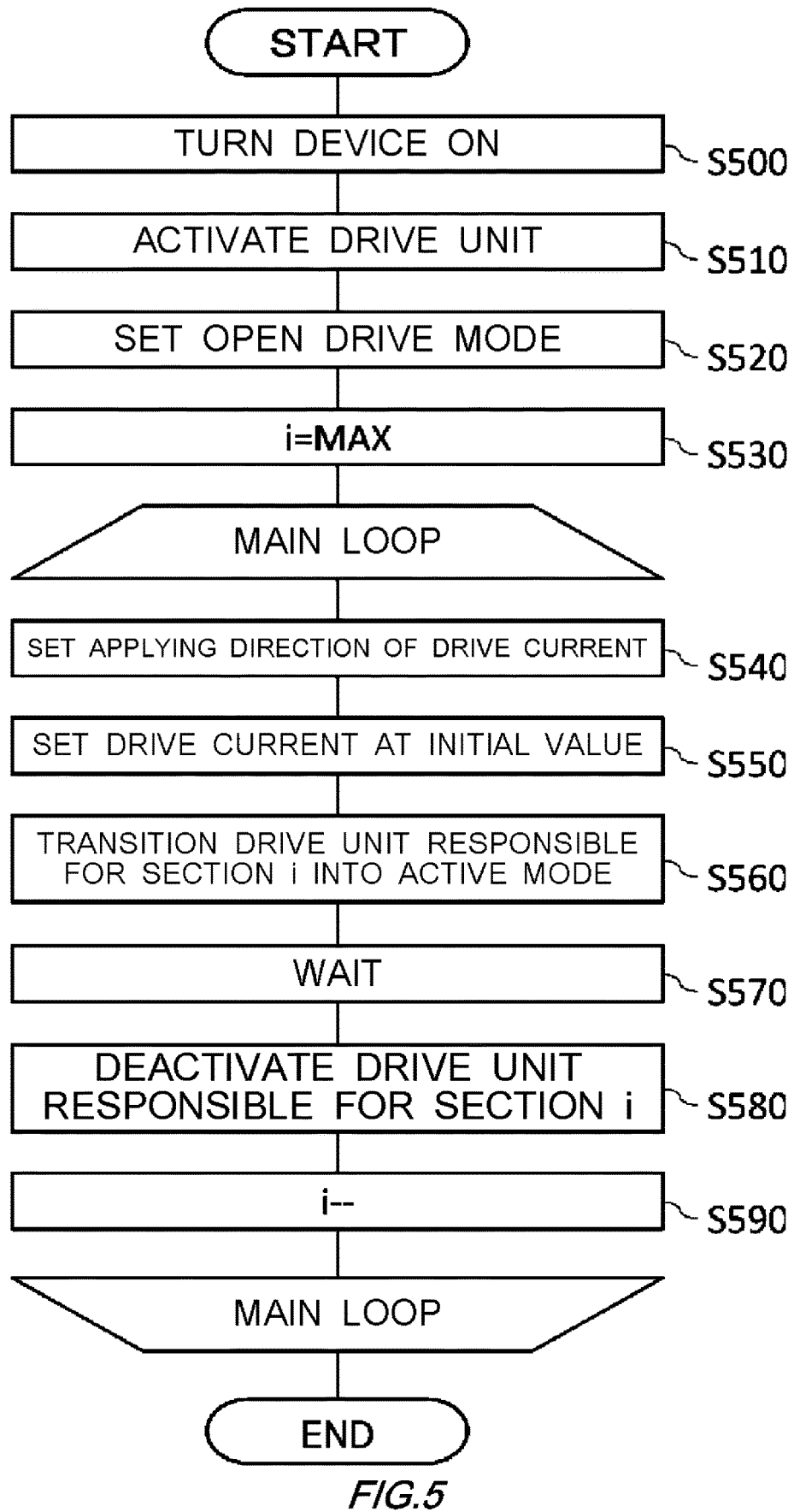
FIG. 5 shows an example flow of operations of the calibration apparatus 100 according to the present embodiment to perform an initial setting when performing open drive on the drive apparatus 50.

FIG. 5 shows an example flow of operations of the calibration apparatus 100 according to the present embodiment performing an initial setting when performing open drive on the drive apparatus 50.

In step S500, the calibration apparatus 100 turns on all devices.

In step S510, the calibration apparatus 100 activates a plurality of drive units 60.

In step S520, the calibration apparatus 100 sets an open drive mode as a control mode. For example, the driving control unit 110 gives a control command to cause the plurality of drive units 60 to transition into the open drive mode. In response, each of the plurality of drive units 60 switches the switch 240 to connect the third terminal to the second terminal. In this way, the plurality of drive units 60 transition into the open drive mode.

In step S530, the calibration apparatus 100 sets i indicating an index of a section at the greatest index. The movable range is divided into ten sections of indexes 0 to 9, and thus the calibration apparatus 100 sets i at 9 as the greatest index. The drive unit 60 responsible for section i=9 is the drive unit 60d, and thus the driving control unit 110 uses the drive unit 60d as a drive unit 60t being the control target at this point. Then, the calibration apparatus 100 enters a main loop in the initial setting.

In step S540, the calibration apparatus 100 sets an applying direction of the drive current. Here, the calibration apparatus 100 sets the applying direction of the drive current to be opposite to the applying direction shown in FIG. 3, that is, the inverted direction if the applying direction shown in FIG. 3 is "non-inverted," and the non-inverted direction if the applying direction shown in FIG. 3 is "inverted". By way of example, when i=9, the applying direction shown in FIG. 3 is "non-inverted", and thus the calibration apparatus 100 sets the inverted direction as the applying direction of the drive current. The driving control unit 110 gives a control command to the drive unit 60t being the control target such that the applying direction of the drive current becomes as set. In accordance with this, the drive unit 60t sets the signs of the first buffer 250 and the second buffer 260 and sets the specified applying direction as the drive current.

In step S550, the calibration apparatus 100 sets the drive current at an initial value. For example, the driving control unit 110 sets the open control signal SO such that the drive current becomes a predetermined initial value.

In step S560, the calibration apparatus 100 transition the drive unit 60 responsible for section i into an active mode. For example, the driving control unit 110 gives a mode transition command to the drive unit 60*t*. In this way, the drive unit 60*t* transitions to the active mode and drives the object 10 by the open drive in accordance with the open control signal SO.

In step S570, the calibration apparatus 100 waits fora certain period. For example, the switch decision unit 130 sets a timer at 100 ms and starts the timer and waits until the timer expires. Note that, the waiting period set as 100 ms is shown as one example here, but it is not limited thereto. The switch decision unit 130 may wait for any sufficient period for the drive of the object 10 to converge when performing the open drive on the drive unit 60*t* being the control target. Note that the "the drive converges" does not necessarily mean that the object 10 becomes motionless. The switch decision unit 130 may wait for any sufficient time at least for the object 10 to be located in a range where the object 10 can be driven by a drive unit 60 responsible for the next section.

In step S580, the calibration apparatus 100 deactivates the drive unit 60 responsible for section i. For example, the switch decision unit 130 supplies a trigger signal indicating a switch of the control target to the driving control unit 110 when the timer expired. In response, the driving control unit 110 gives the mode transition command to the drive unit 60*t* being the control target. In this way, the drive unit 60*t* is deactivated.

In step S590, the calibration apparatus 100 performs decrement on i. In other words, the calibration apparatus 100 sets i=i−1. In response, the driving control unit 110 switches the drive unit 60*t* being the control target. For example, when decrement is performed as i=8, because the drive unit 60 responsible for section i=8 is the drive unit 60*c*, the driving control unit 110 switches the control target from the drive unit 60*d* to the drive unit 60*c*. The calibration apparatus 100 repeatedly executes such a main loop until i becomes 0, which is the smallest index. In other words, the calibration apparatus 100 moves the object 10 to the initial position of 0 mm as an end of the movable range by sequentially controlling the plurality of drive units 60 in an opposite procedure of driving the object 10 from the position of 0 mm as an end of the movable range to the position of 10 mm as the opposite end. In this manner, the calibration apparatus 100 performs the initial setting on the drive apparatus 50.

Figure 6:
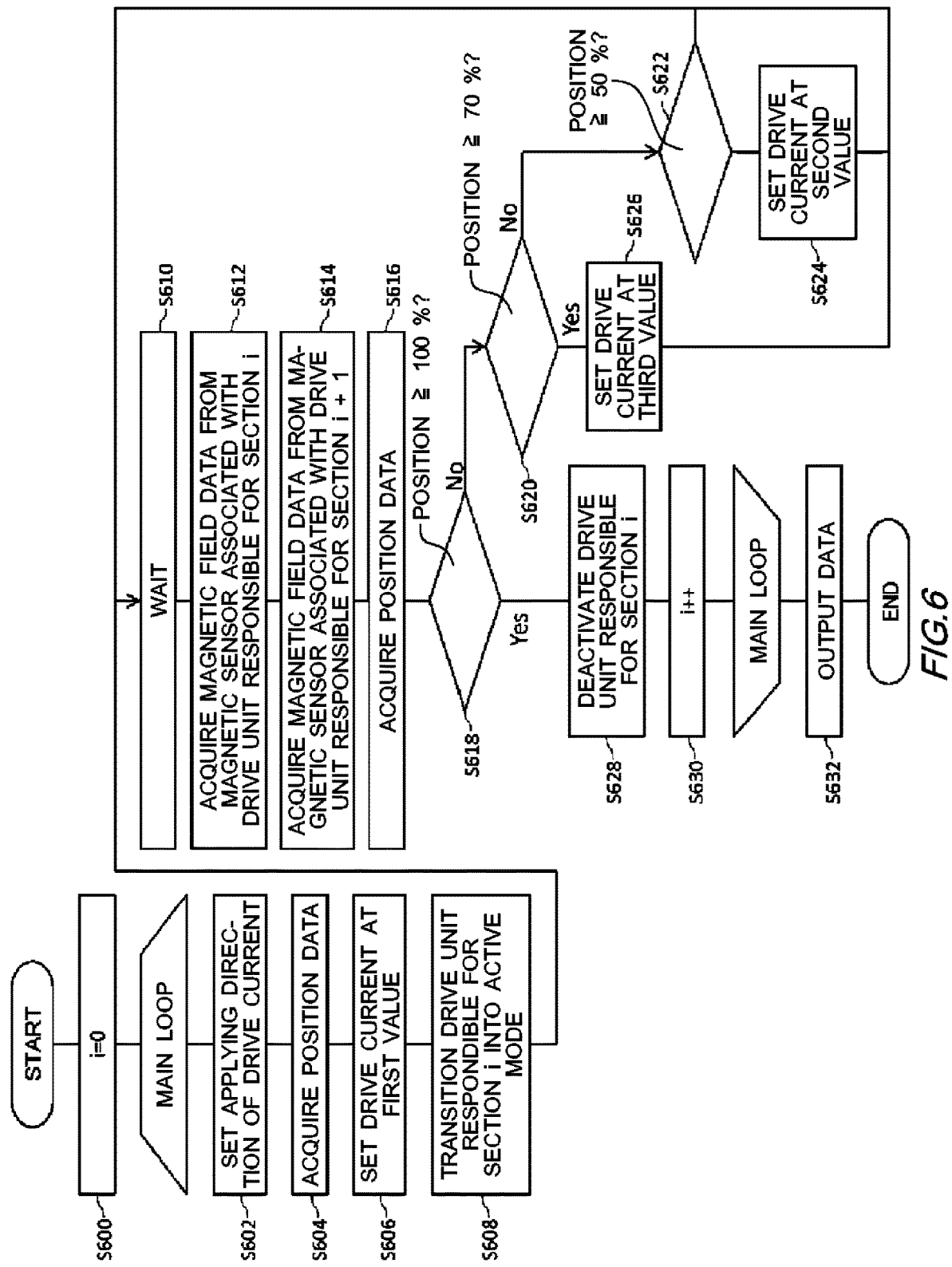
FIG. 6 shows an example flow of operations of the calibration apparatus 100 according to the present embodiment to acquire position data and magnetic field data by performing open drive of the drive apparatus 50.

FIG. 6 shows an example flow of the calibration apparatus 100 according to the present embodiment acquiring position data and magnetic field data by performing an open drive on a drive apparatus 50. The calibration apparatus 100 may perform this flow of operations, following the initial setting flow of FIG. 5. In other words, the calibration apparatus 100 may perform this flow of operations after moving the object 10 to the initial position.

In step S600, the calibration apparatus 100 sets i at 0, which is the smallest index. The drive unit 60 responsible for section i=0 is the drive unit 60*a*, and thus the driving control unit 110 uses the drive unit 60*a* being the control target as a drive unit 60*t* at this point. The calibration apparatus 100 enters a main loop.

In step S602, the calibration apparatus 100 sets an applying direction of the drive current. The calibration apparatus 100 sets the applying direction of the drive current same as the applying direction shown in FIG. 3. By way of example, in a case of i=0, the applying direction shown in FIG. 3 is "non-inverted," and thus the calibration apparatus 100 set the applying direction of the drive current to the non-inverted direction. The driving control unit 110 gives the drive unit 60*t* being the control target a control command such that the applying direction of the drive current becomes as set. In accordance with this, the drive unit 60*t* sets the signs of the first buffer 250 and the second buffer 260 and sets the specified applying direction as the drive current.

In step S604, the calibration apparatus 100 acquires position data. For example, the position acquisition unit 120 acquires the position data indicating data regarding the position of the object 10. Here, the position acquisition unit 120 may acquire, as the position data, measurement data of the position of the object 10 measured by means of a laser displacement meter. In this way, the calibration apparatus 100 acquires the data indicating the value of the magnetic field when the object 10 is located at an end of section i (the initial position). The position acquisition unit 120 supplies the acquired position data to the switch decision unit 130.

In step S606, the calibration apparatus 100 sets the drive current at the first value. For example, the driving control unit 110 sets the open control signal SO such that the drive current becomes a predetermined first value.

In step S608, the calibration apparatus 100 transition the drive unit 60 responsible for section i into an active mode. For example, the driving control unit 110 gives a mode transition command to the drive unit 60*t*. In this way, the drive unit 60*t* transitions to the active mode and drives the object 10 by the open drive in accordance with the open control signal SO.

In step S610, the calibration apparatus 100 waits fora certain period. For example, the magnetic field acquisition unit 140 sets a timer at 1 ms and starts the timer and waits until the timer expires. Note that, the waiting period set as 1 ms is shown as one example here, but it is not limited thereto. The magnetic field acquisition unit 140 may wait for any optimal period for sampling the magnetic field data.

In step S612, the calibration apparatus 100 acquires the magnetic field data from the drive unit 60 responsible for section i. For example, the magnetic field acquisition unit 140 acquires the magnetic field data detected by the magnetic sensor 80 associated with the drive unit 60 responsible for section i, that is, the drive unit 60*t* being the current control target when the timer expires. The magnetic field acquisition unit 140 acquires the magnetic field data from the magnetic sensor 80 associated with the drive unit 60 having becoming the control target in this manner.

In step S614, the calibration apparatus 100 acquires the magnetic field data from the drive unit 60 responsible for section i+1. For example, the magnetic field acquisition unit 140 further acquires the magnetic field data detected by the magnetic sensor 80 associated with the drive unit 60 responsible for section i+1, that is, the drive unit 60 responsible for the next section when the timer expires. In this manner, the calibration apparatus 100 can minimize the missing of the magnetic field data involved with the switch of the drive unit 60 by acquiring the magnetic field data from the magnetic sensor 80 associated with the drive unit 60 to be the next control target in addition to the drive unit 60*t* being the current control target.

In step S616, the calibration apparatus 100 acquires position data. Step S616 may be the same as step S604, and thus the detailed description is omitted.

In step S618, the calibration apparatus 100 decides whether the position is 100% or more. Herein, the position of an end of each section is 0%, and the position of the opposite end is 100%. By way of example, in section i=0, the position of 0 mm is the position of 0%, and the position of 1 mm is the position of 100%. For example, the switch decision unit 130 decides whether the position of the object 10 indicated by the position data acquired in step S616 is 100% or more. When it is decided to be less than 100% (when No), the calibration apparatus 100 cause the process to proceed to step S620.

In step S620, the calibration apparatus 100 decides whether the position is 70% or more. For example, the switch decision unit 130 decides whether the position of the object 10 indicated by the position data acquired in step S616 is 70% or more. By way of example, in section i=0, the switch decision unit 130 decides whether the position is 0.7 mm or more. When it is decided as less than 70% (when No), the calibration apparatus 100 causes the process to proceed to step S622.

In step S622, the calibration apparatus 100 decides whether the position is 50% or more. For example, the switch decision unit 130 decides whether the position of the object 10 indicated by the position data acquired in step S616 is 50% or more. By way of example, in section i=0, the switch decision unit 130 decides whether the position is 0.5 mm or more. When it is decided as less than 50% (when No), the calibration apparatus 100 causes the process to be back to step S610 and continues the flow of operations.

Meanwhile, in step S622, when it is decided as 50% or more (when Yes), the calibration apparatus 100 causes the process to proceed to step S624. In step S624, the calibration apparatus 100 sets the drive current at the second value. Note that if the process of step S624 has already been performed, the calibration apparatus 100 may skip the process of step S624. For example, the driving control unit 110 changes the open control signal SO such that the drive current becomes a predetermined second value. Here, the second value may be greater than the first value. In other words, when the position is decided to be 50% or more, the driving control unit 110 may change the open control signal SO such that the drive current becomes greater than that when the position is less than 50%. The calibration apparatus 100 causes the process to be back to step S610 and continues the flow.

Also, in step S620, when it is decided as 70% or more (when Yes), the calibration apparatus 100 causes the process to proceed to step S626. In step S626, the calibration apparatus 100 sets the drive current at the third value. Note that if the process of step S626 has already been performed, the calibration apparatus 100 may skip the process of step S626. For example, the driving control unit 110 changes the open control signal SO such that the drive current becomes a predetermined third value. The third value may be greater than the second value. In other words, when the position is decided to be 70% or more, the driving control unit 110 may change the open control signal SO such that the drive current becomes greater than that when the position is less than 70%. The calibration apparatus 100 causes the process to be back to step S610 and continues the flow.

In this way, the driving control unit 110 may control and increase the drive current step by step to be the first value, the second value, and the third value when the position of the object 10 in each section is less than 50%, when it is 50% or more and less than 70%, and when it is 70% or more, respectively. In this manner, the driving control unit 110 may gradually increase a magnitude of the drive current when the driving control unit causes the object 10 to move from an end to an opposite end in each section. In this way, the calibration apparatus 100 can suppress a mechanical malfunction, noise or the like caused by the sudden move of the object 10. Also the calibration apparatus 100 can stably drive the object 10 to an end point of the movable range even when it is housing difficult to move.

Note that in the foregoing description, a case where the second value is greater than the first value, the second value is further greater than the third value, that is, the first value<the second value<the third value is shown as one example. However, it is not limited thereto. The second value may be smaller than the first value, and the second value may be further smaller than the third value. In other words, the first value>the second value>the third value is also possible. In other words, the driving control unit 110 may control and decrease the drive current step by step to be the first value, the second value, and the third value when the position of the object 10 in each section is less than 50%, when it is 50% or more and less than 70%, and when it is 70% or more, respectively. In this manner, the driving control unit 110 may gradually decrease a magnitude of the drive current when the driving control unit 110 causes the object 10 to move from an end to an opposite end in each section. In this way, the calibration apparatus 100 reduces the moving speed as the object 10 approaches to an opposite end in each section, and thus the missing of the magnetic field data in the vicinity of the opposite end can be suppressed. Note that in the foregoing description, the driving control unit 110 using three current values of the first value, the second value, and the third value is shown as one example, but the number of the current values is not limited thereto. The driving control unit 110 may simplify the control by using one or two current values, or may perform closer control by using four or more current values.

Also in step S618, when it is decided as 100% or more (when Yes), the calibration apparatus 100 causes the process to proceed to step S628. For example, the switch decision unit 130 decides that the object 10 has moved to an opposite end in the current section when the position of the object 10 indicated by the position data acquired in step S616 is 100% or more. In this manner, for example, the switch decision unit 130 can decide that the object 10 has moved to the opposite end when the position data exceeds a prestored standard. In step S628, the calibration apparatus 100 deactivates the drive unit 60 responsible for section i. For example, when the position of the object 10 is decided as 100% or more, the switch decision unit 130 supplies, to the driving control unit 110, a trigger signal indicating the switch of the control target. In response, the driving control unit 110 gives the mode transition command to the drive unit 60*i* being the control target. In this way, the drive unit 60*i* deactivates.

In step S630, the calibration apparatus 100 performs increment on i. In other words, the calibration apparatus 100 sets i=i+1. Corresponding to this, the driving control unit 110 switches the drive unit 60*i* being the control target. For example, when increment is performed as i=2, because the drive unit 60 responsible for section i=2 is the drive unit 60*b*, the driving control unit 110 switches the control target from the drive unit 60*a* to the drive unit 60*b*. The calibration apparatus 100 repeatedly executes such a main loop until i becomes 9, which is the greatest index. In this manner, the calibration apparatus 100 sequentially switches and controls the plurality of drive units 60 to drive the object 10 in the movable range, and acquires the position data and the magnetic field data.

In step S632, the calibration apparatus 100 outputs the acquired data. For example, the position acquisition unit 120 and the magnetic field acquisition unit 140 supplies each of the position data and magnetic field data acquired by repeating the main loop to the generating unit 150.

Figure 7:
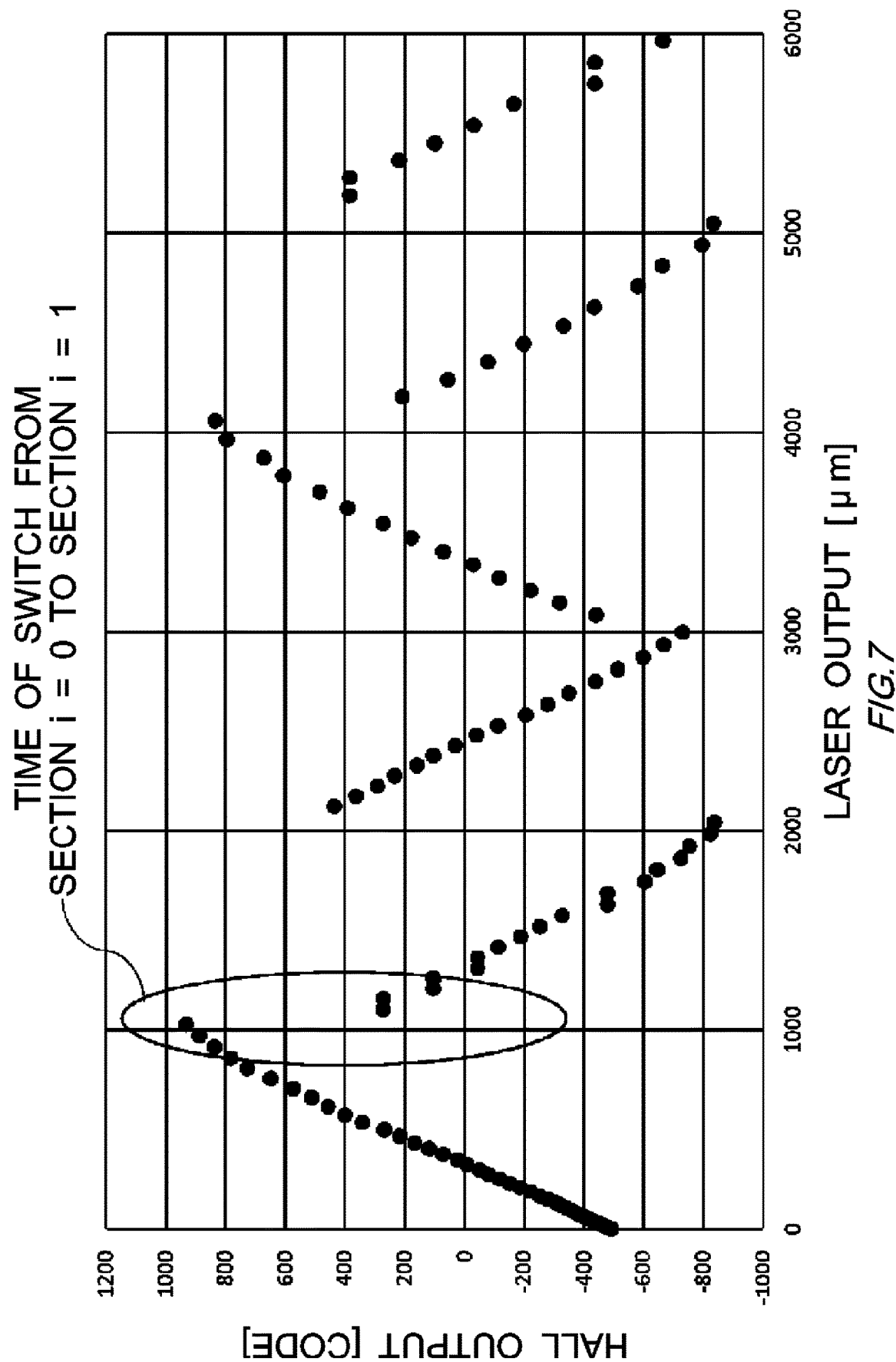
FIG. 7 shows an example of the position data and magnetic field data acquired by the calibration apparatus 100 according to the present embodiment.

FIG. 7 shows an example of the position data and magnetic field data acquired by the calibration apparatus 100 according to the present embodiment. In the present drawing, the horizontal axis represents the output of a laser displacement meter as the position data by the unit [μm]. In the present drawing, the vertical axis represents the output of a Hall sensor as the magnetic field data by [code]. For example, in the present drawing, a section in which the laser outputs are from 0 μm to 1000 μm represents section i=0. The Hall outputs acquired in a substantially linearly upward state in said section represent the magnetic field data acquired from the magnetic sensor 80a associated with the drive unit 60a responsible for section i=0. In the same way, in the present drawing, the section in which the laser outputs are from 1000 μm to 2000 μm represents section i=1. The Hall outputs acquired in a substantially linearly downward state in said section represent the magnetic field data acquired from the magnetic sensor 80b associated with the drive unit 60b responsible for section i=1.

As shown in the present drawing, it can be found that some pieces of the magnetic field data are missing during the switch of each section. By way of example, focusing on the time of the switch from section i=0 to section i=1, it can be found that the Hall output at the time when the laser output is exactly at 1000 μm is not acquired from the magnetic sensor 80a. In other words, it can be considered that the value of the magnetic field data at an opposite end in section i=0 is failed to be acquired. It is considered that one of the causes of this is the fact of sampling the magnetic field data periodically (for every 1 ms, for example). Also it is found that the Hall output at the time when the laser output is exactly 1000 μm is not acquired from the magnetic sensor 80b as well. In other words, it can be considered that the value of the magnetic field data at an end in section i=1 is failed to be acquired. It is considered that one of the causes of this is the fact that performing the acquisition processing of the magnetic field data was temporarily failed due to an interruption process of switching the control target from the drive unit 60a to the drive unit 60b. This applies to when switching between other sections.

Therefore, based on the position data and the magnetic field data acquired in this manner, the calibration apparatus 100 according to the present embodiment generates the end point information by computation. The calibration apparatus 100 determines each driving range in the plurality of sections by using the generated end point information.

Figure 8:
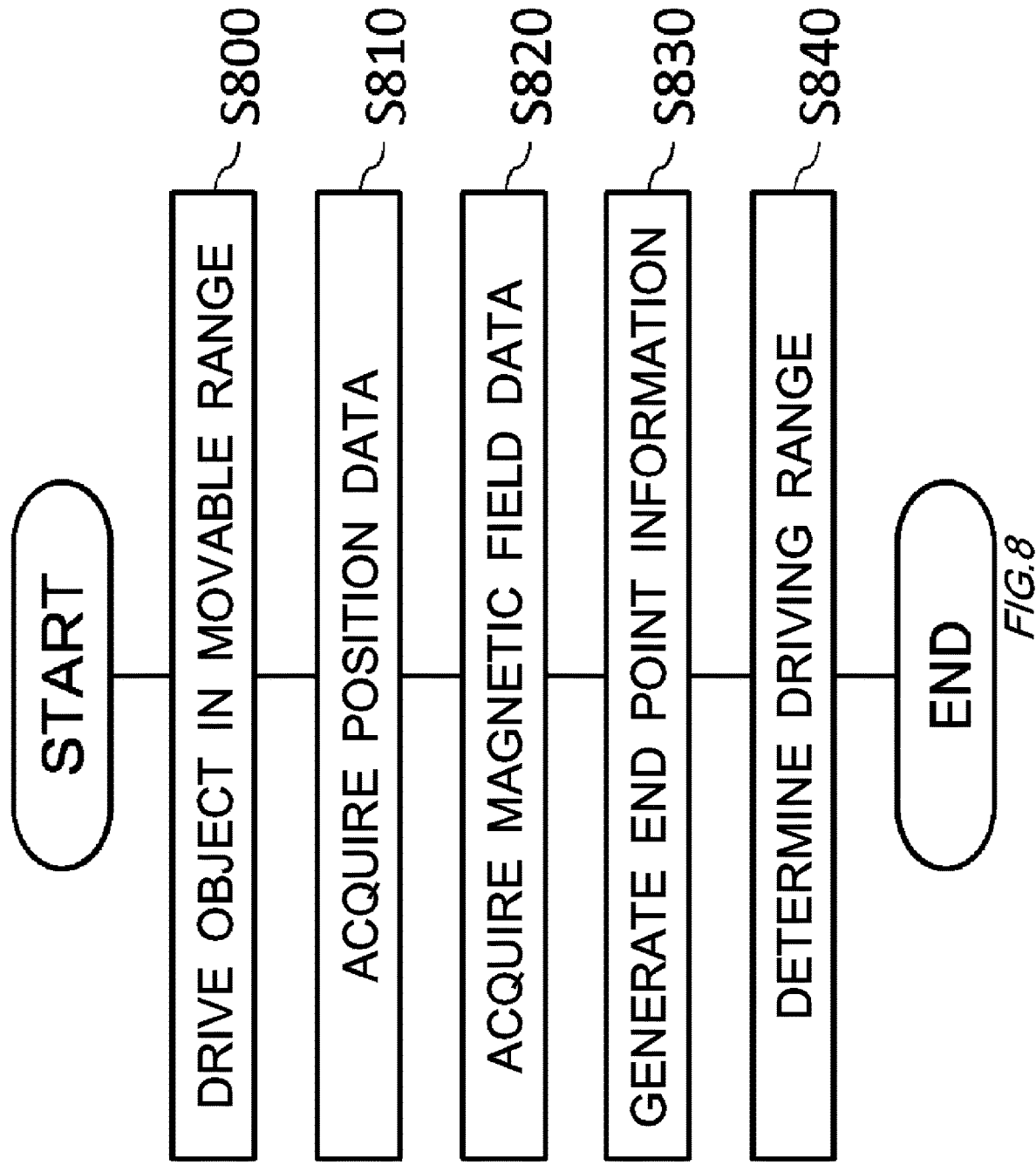
FIG. 8 shows an example flow of operations of the calibration apparatus 100 according to the present embodiment to determine a driving range by generating end point information.

FIG. 8 shows an example flow of operations of the calibration apparatus 100 according to the present embodiment to determine a driving range by generating end point information.

In step S800, the calibration apparatus 100 drives the object 10 in a movable range. For example, the driving control unit 110 sequentially controls, in calibration of a drive apparatus 50 including: a plurality of drive units 60 configured to drive an object 10 provided with a lens 20 within each of a plurality of sections into which a movable range for moving the object 10 in an optical axis-direction is divided; and a magnetic field detection unit 70 configured to detect a magnetic field corresponding to a position of the object 10, the plurality of drive units 60 to drive the object 10 in the movable range.

In step S810, the calibration apparatus 100 acquires position data. For example, the position acquisition unit 120 acquires position data indicating data regarding the position of the object 10. The position acquisition unit 120 supplies the acquired position data to the generating unit 150.

In step S820, the calibration apparatus 100 acquires magnetic field data. For example, the magnetic field acquisition unit 140 acquires magnetic field data indicating the magnetic field corresponding to the position of the object 10. The magnetic field acquisition unit 140 supplies the acquired magnetic field data to the generating unit 150. The calibration apparatus 100 can perform the flow of such processes from step S800 to step S820 through the flow of FIG. 6, for example.

In step S830, the calibration apparatus 100 generates end point information. For example, the generating unit 150 generates end point information indicating a value of the magnetic field data when the object 10 is located at each of the end points (an end and an opposite end) of the plurality of sections, based on the position data acquired in step S810 and the magnetic field data acquired in step S820. Here, the generating unit 150 may generate the end point information, for example, by using a regression analysis using the position data and the magnetic field data.

In step S840, the calibration apparatus 100 determines a driving range. For example, the generating unit 150 determines each driving range in a plurality of sections by using the end point information generated in step S830. In other words, the generating unit 150 determines, as the driving range of each section, a range corresponding to the magnetic field range defined by a value of the magnetic field data when the object 10 is located at an end of each section and a value of the magnetic field data when the object 10 is located at the opposite end.

Figure 9:
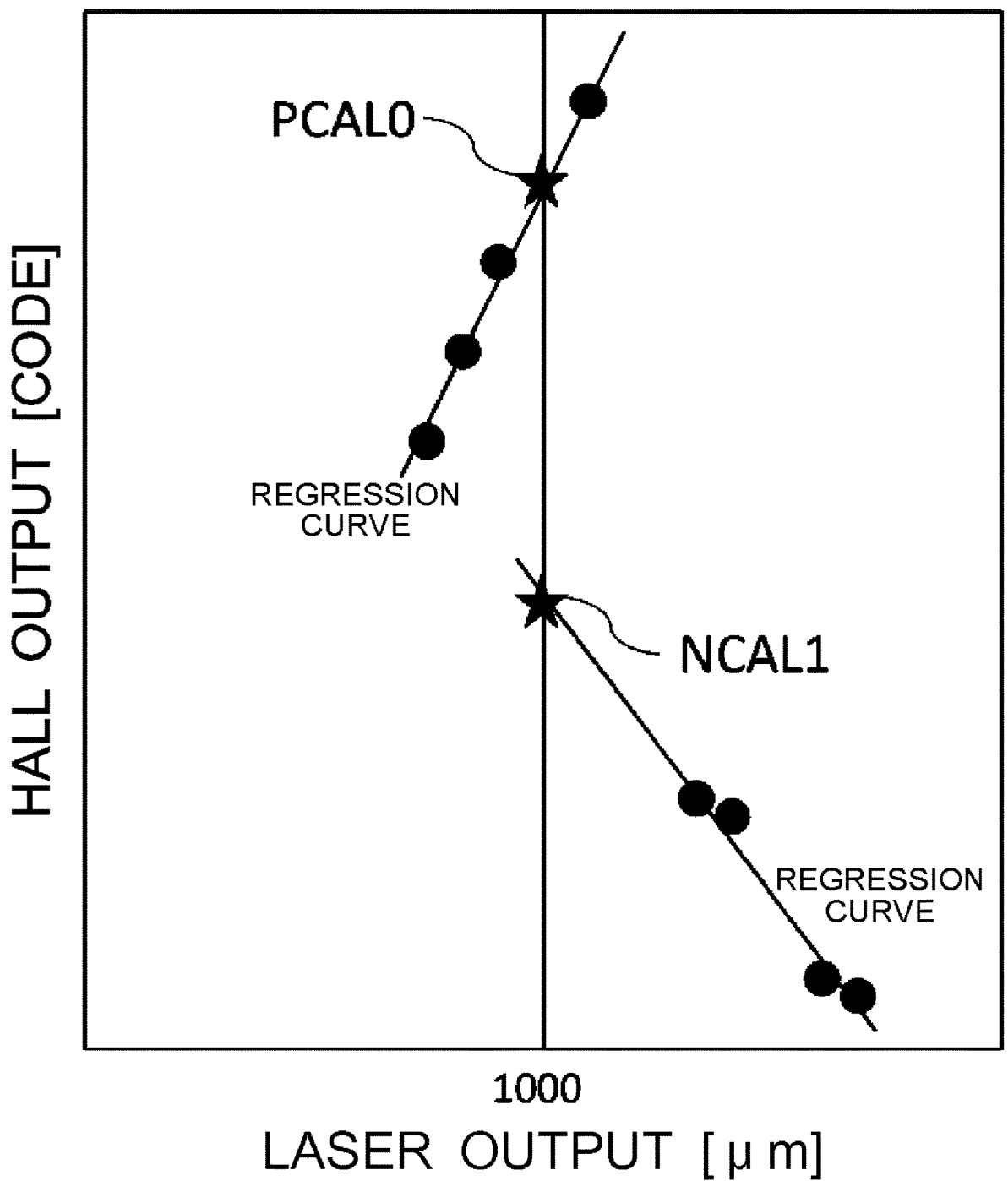
FIG. 9 shows an example of the end point information generated by the calibration apparatus 100 according to the present embodiment.

FIG. 9 shows an example of the end point information generated by the calibration apparatus 100 according to the present embodiment. The present drawing is an enlarged one of FIG. 7 at a time of switching from section i=0 to section i=1. The generating unit 150 generates a regression curve in section i=0 by performing a regression analysis on the position data and the magnetic field data acquired from the magnetic sensor 80a. The generating unit 150 generates a value on the regression curve at the position of 1000 μm as end point information PCAL0 indicating a value of the magnetic field data at an opposite end of section i=0. In this manner, the generating unit 150 may interpolate end point information.

Also, the generating unit 150 generates a regression curve in section i=1 by performing a regression analysis on the position data and the magnetic field data acquired from the magnetic sensor 80b. The generating unit 150 generates a value on the regression curve at the position of 1000 μm as end point information NCAL1 indicating the magnetic field data at an end of section i=1. In this manner, the generating unit 150 may extrapolate end point information.

In the same way, the calibration apparatus 100 generates end point information NCAL at an end of other sections and end point information PCAL at the opposite end. The calibration apparatus 100 can interpolate missing data in this manner.

Figure 10:
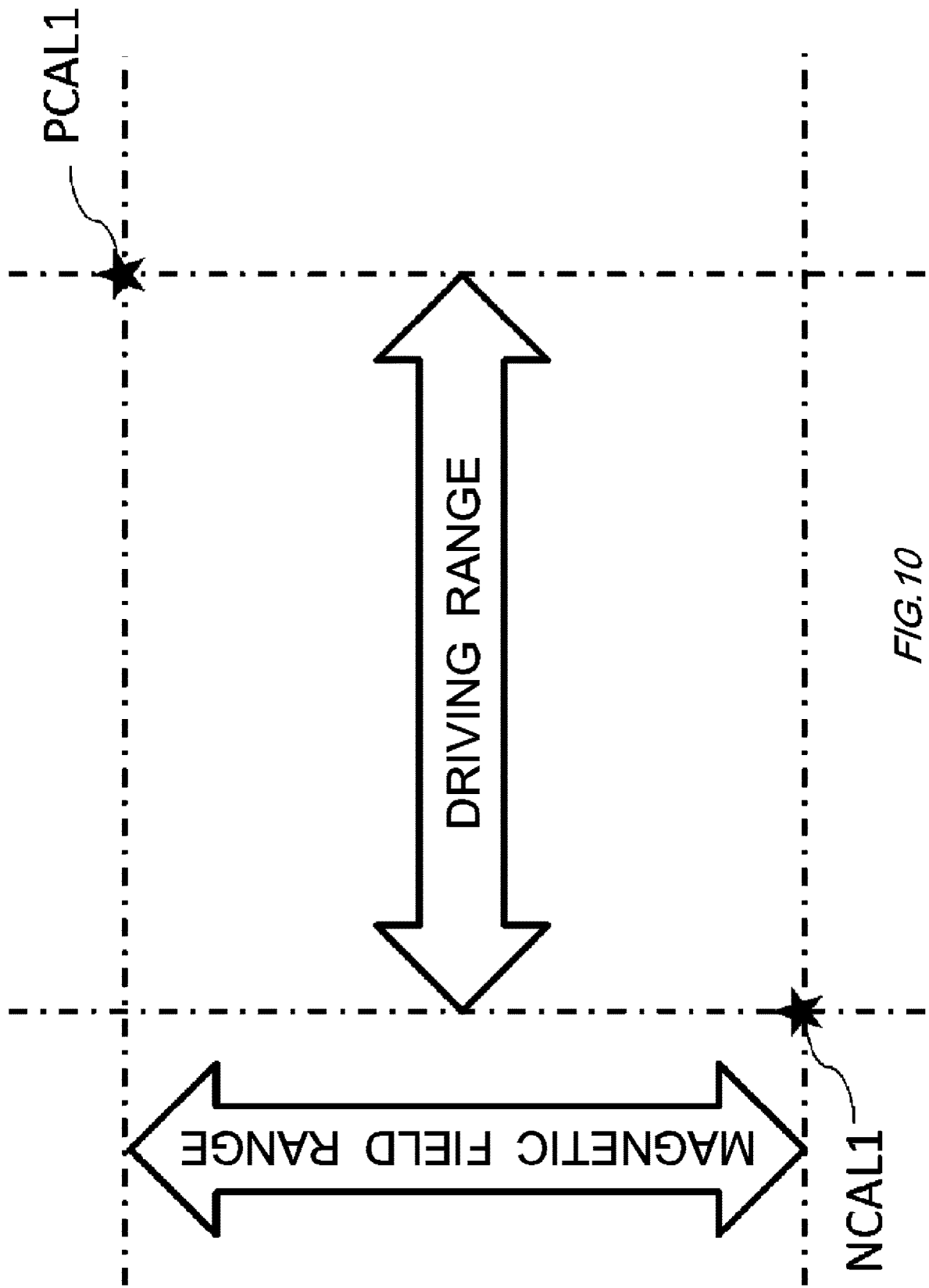
FIG. 10 shows an example of the driving range determined by the calibration apparatus 100 according to the present embodiment.

FIG. 10 shows an example of the driving range determined by the calibration apparatus 100 according to the present embodiment. In the present drawing, by way of example, the driving range determined for section i=1 is shown. Here, the generating unit 150 has already generated end point information NCAL1 indicating a value of magnetic field data at an end of section i=1 and end point information PCAL1 indicating a value of magnetic field data at the opposite end. In this case, the generating unit 150 defines magnetic field range by the end point information NCAL1 at an end and the end point information PCAL1 at the opposite end. The generating unit 150 determines a range corresponding to said magnetic field range as the driving range in section i=1. The calibration apparatus 100 determines driving ranges for the other sections in the same way.

Conventionally, end point information is obtained by mechanically causing the object 10 to contact with the end point. However, when the object 10 is driven for a long distance while the plurality of drive units are sequentially switched, the end point information on each section cannot be obtained by mechanical contact. The calibration apparatus 100 according to the present embodiment is configured to acquire position data and magnetic field data by performing open drive on the drive apparatus 50 when performing calibration on the drive apparatus 50 configured to drive the object 10. Based on the acquired data, the calibration apparatus 100 is configured to generate end point information for each of a plurality of sections into which a movable range of the object 10 is divided to determine a driving range. In this way, the calibration apparatus 100 according to the present embodiment can determine the driving range by generating the end point information even when the end point information cannot be obtained by mechanically contacting. Here, the calibration apparatus 100 according to the present embodiment generates the end point information by using a regression analysis using the position data and the magnetic field data. In this way, the calibration apparatus 100 according to the present embodiment can interpolate, as end point information, an objective value of magnetic field data based on actually acquired data.

Figure 11:
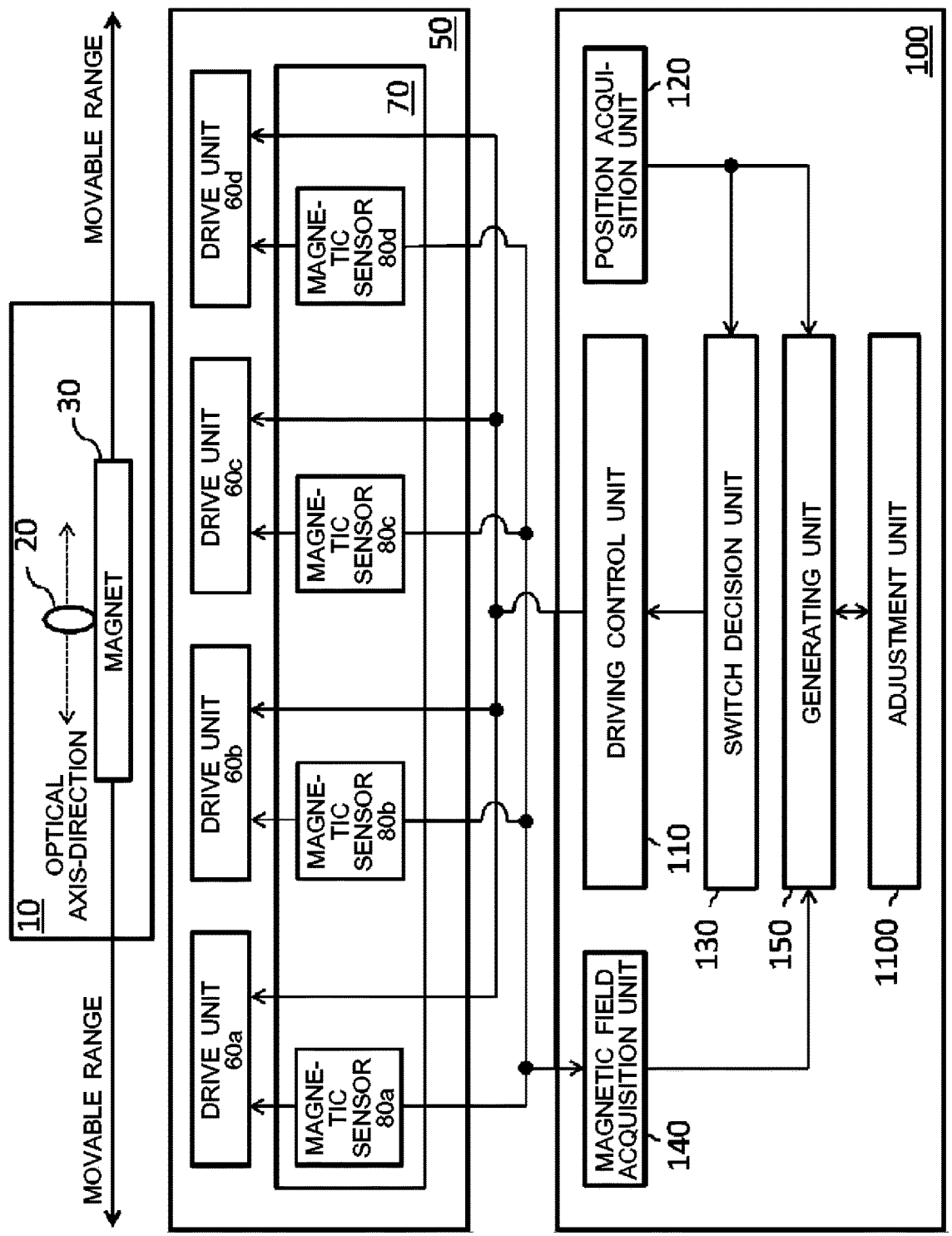
FIG. 11 shows an example of a block diagram of a calibration apparatus 100 according to a variation of the present embodiment together with the object 10 and the drive apparatus 50.

FIG. 11 shows an example of a block diagram of a calibration apparatus 100 according to a variation of the present embodiment together with the object 10 and the drive apparatus 50. In FIG. 11, the members having the same functions and configurations as those in FIG. 1 are denoted with the same reference signs, and the descriptions thereof are omitted, except for differences to be described below. The calibration apparatus 100 according to the embodiment described above has the function of generating end point information based on the data acquired by performing open drive on the drive apparatus 50. However, the calibration apparatus 100 according to the present variation further has, in addition to the function that the calibration apparatus 100 according to the embodiment described above has, the function of adjusting the end point information generated by performing close drive on the drive apparatus 50. The calibration apparatus 100 according to the present variation further include, in addition to the function that the calibration apparatus 100 according to the embodiment described above include, an adjustment unit 1100.

The adjustment unit 1100 is configured to adjust the end point information in response to the feedback control having been performed based on the magnetic field data. The calibration apparatus 100 according to the present variation performs close drive on the drive apparatus 50 such that the position of the object 10 is located at the end point of each section in accordance with the determined driving range. The calibration apparatus 100 acquires the position data indicating the position of the object 10 at this time. In other words, the calibration apparatus 100 checks the actual position of the object 10 by the laser displacement meter. When the actual position of the object 10 is off a desired position, the adjustment unit 1100 changes the generated end point information. In response, the position of the object 10 is displaced by the feedback control. The adjustment unit 1100 repeats such changes in the end point information until the actual position of the object 10 is placed at the desired position. In this manner, the adjustment unit 1100 adjusts the end point information. By using the end point information after adjustment, the calibration apparatus 100 determines the driving range for each section again. The calibration apparatus 100 according to the present variation may perform fine tuning on the end point information in this manner.

Figure 12:
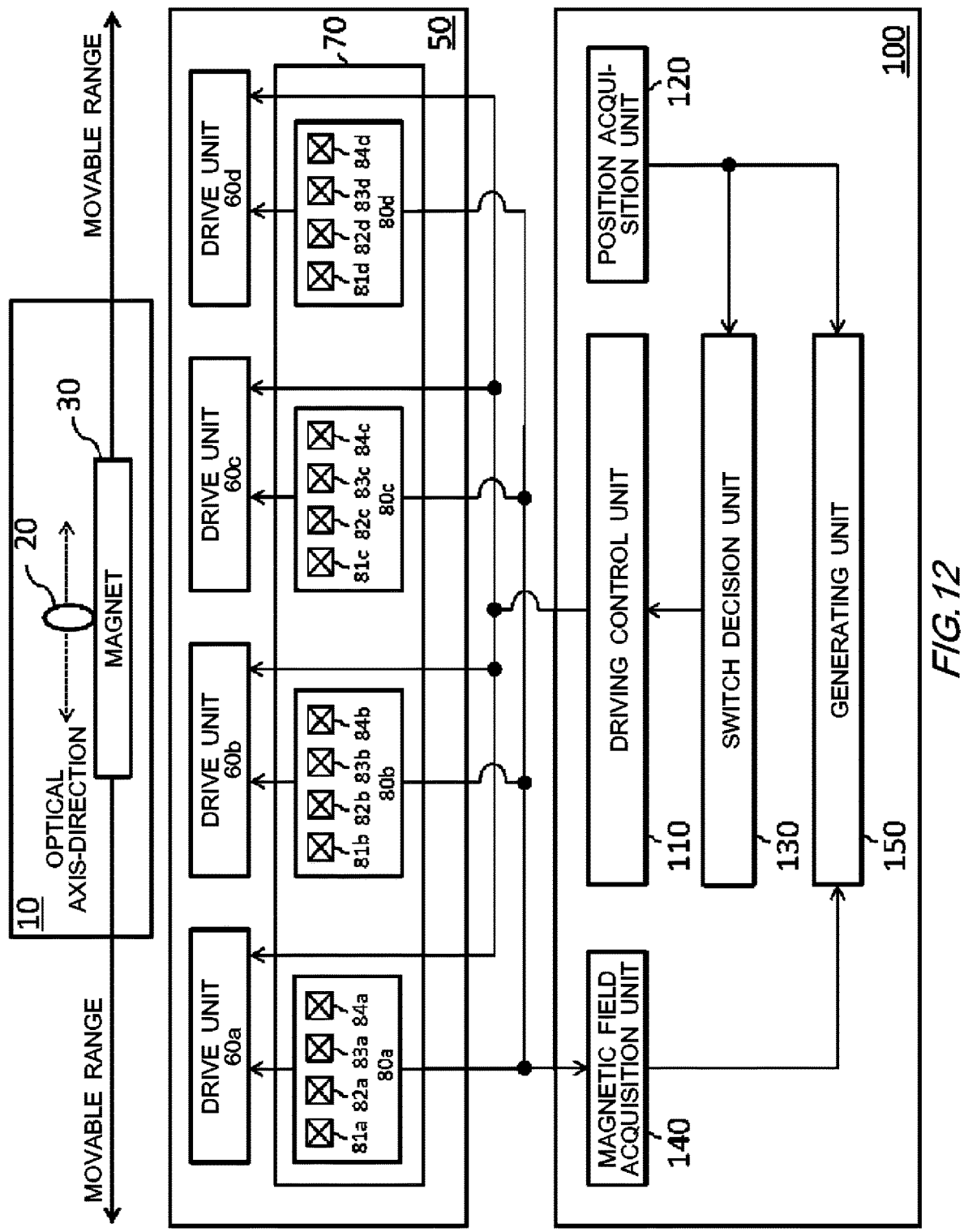
FIG. 12 shows an example of a block diagram of the calibration apparatus 100 according to the present embodiment together with the object 10 and a drive apparatus 50 according to a variation.

FIG. 12 shows an example of a block diagram of the calibration apparatus 100 according to the present embodiment together with the object 10 and a drive apparatus 50 according to a variation. In FIG. 12, the members having the same functions and configurations as those in FIG. 1 are denoted with the same reference signs, and the descriptions thereof are omitted, except for differences to be described below. In the embodiment described above, a case where each of the plurality of magnetic sensors 80a-d is composed of one sensor element is described as one example. However, in the present variation, each of a plurality of magnetic sensors 80a-d is composed of a sensor element group.

For example, the magnetic sensor 80a is composed of a sensor element group consisting of the first sensor element 81a, the second sensor element 82a, the third sensor element 83a, and the fourth sensor element 84a. Also, the magnetic sensor 80b is composed of a sensor element group consisting of the first sensor element 81b, the second sensor element 82b, the third sensor element 83b, and the fourth sensor element 84b. Also, the magnetic sensor 80c is composed of a sensor element group consisting of the first sensor element 81c, the second sensor element 82c, the third sensor element 83c, and the fourth sensor element 84c. Also, the magnetic sensor 80d is composed of a sensor element group consisting of the first sensor element 81d, the second sensor element 82d, the third sensor element 83d, and the fourth sensor element 84d.

The first sensor elements 81a-d are collectively referred to as the first sensor element 81, the second sensor elements 82a-d are collectively referred to as the second sensor element 82, the third sensor elements 83a-d are collectively referred to as the third sensor element 83, and the fourth sensor elements 84a-d are collectively referred to as the fourth sensor element 84. In the present drawing, a case where each of the plurality of magnetic sensors 80a-d are composed of the sensor element group consisting of four sensor elements 81-84 is shown as one example, it is not limited thereto. Each of the plurality of magnetic sensors 80a-d may be composed of a sensor element group consisting of a plurality of sensor elements, including two, three, or more than four sensor elements. In the present variation, in this manner, each of the plurality of magnetic sensors 80a-d may be composed of a sensor element group consisting of a plurality of sensor elements 81-84. Here, for example, when each set of the plurality of drive units 60a-d and the magnetic sensors 80a-d is configured as one IC, the plurality of sensor elements 81-84 may be arranged inside the drive coil 200.

In this manner, when each of the plurality of magnetic sensors 80a-d is composed of a sensor element group, the magnetic field acquisition unit 140 may acquire magnetic field data from any one sensor element among the plurality of sensor elements 81-84. Note that such a sensor element may be selected in accordance with the position of the object 10 at each section, for example.

Alternatively, the magnetic field acquisition unit 140 may acquire magnetic field data from a plurality of sensor elements among the plurality of sensor elements 81-84 (for example, all sensor elements). In this case, the magnetic field acquisition unit 140 may acquire the sum, average or another computation result of data from the plurality of sensor elements as the magnetic field data. In this way, the calibration apparatus 100 can reduce the gap between outputs of a plurality of ICs that are arranged together generated depending on their individual differences.

Figure 13:
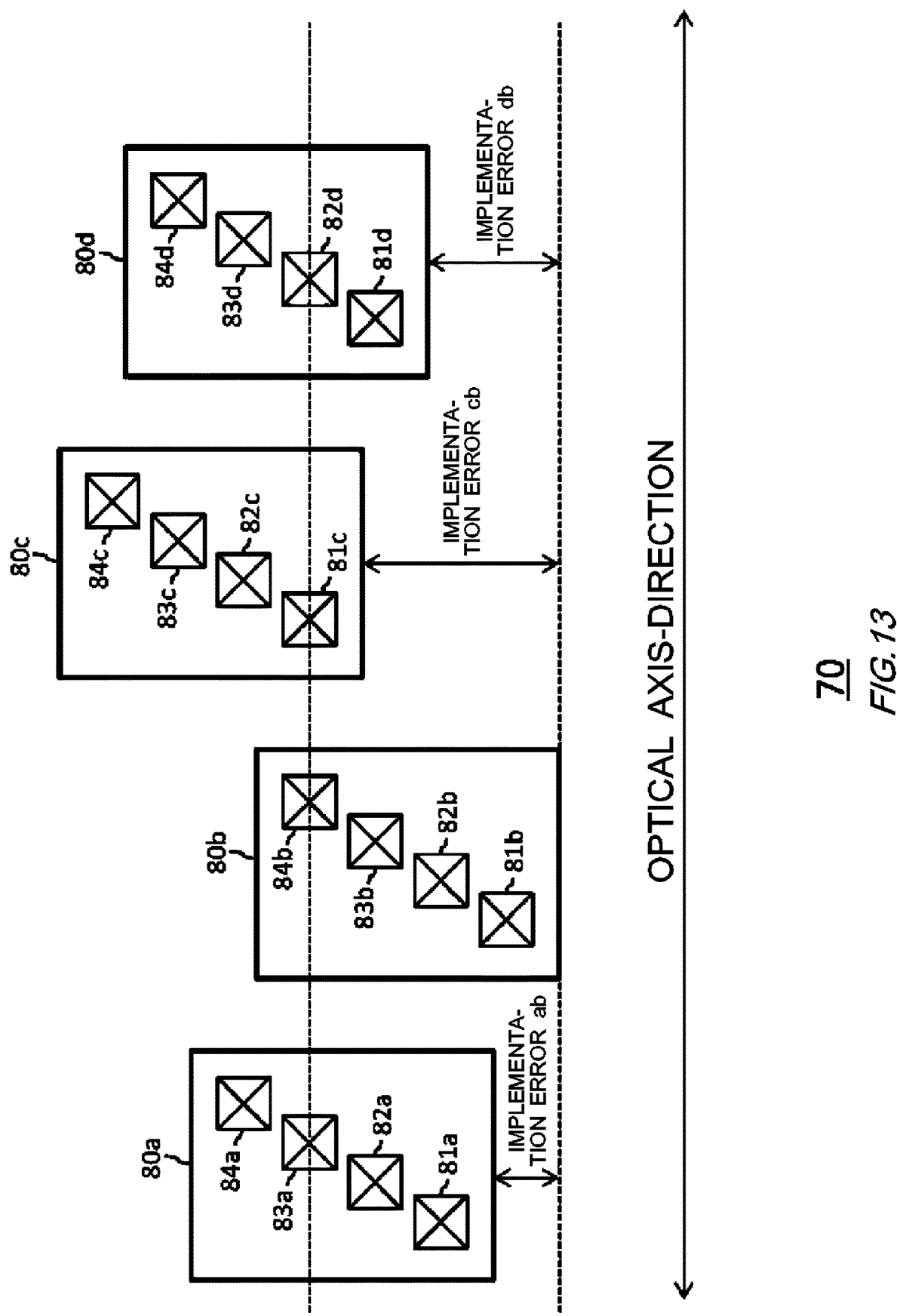
FIG. 13 shows an exemplary arrangement of magnetic sensors 80 in a magnetic field detection unit 70 according to a variation of the present embodiment.

FIG. 13 shows an exemplary arrangement of magnetic sensors 80 in a magnetic field detection unit 70 according to a variation of the present embodiment. In the present drawing, the horizontal axis represents the optical axis-direction of the lens 20. In the present drawing, the vertical axis represents the direction orthogonal to the optical axis-direction. In the present drawing, a case where the plurality of magnetic sensors 80a-d have implementation errors generated in the direction orthogonal to the optical axis-direction is shown as an example. For example, the magnetic sensor 80a may have an implementation error ab in relation to the magnetic sensor 80b. Also, the magnetic sensor 80c may have an implementation error cb (>the implementation error ab) in relation to the magnetic sensor 80b. Also, the magnetic sensor 80d may have a implementation error db (<the implementation error ab, and <the implementation error cb) in relation to the magnetic sensor 80b. In such a case, the distances from the magnet 30 are: the magnetic sensor 80a<the magnetic sensor 80d<the magnetic sensor 80c, and thus the magnitudes of the detected magnetic fields are: the magnetic sensor 80a>the magnetic sensor 80d>the magnetic sensor 80c. Accordingly, due to the implementation errors, gaps between outputs of the magnetic sensors 80 may be generated.

Therefore, in each of the plurality of magnetic sensors 80a-d, each of the plurality of sensor elements 81-84 is better to be arranged out of alignment with each other in the optical axis-direction and a direction crossing with the optical axis-direction (a direction other than the optical axis-direction). In the present drawing, a case where each of the plurality of sensor elements 81-84 is arranged out of alignment with each other in the direction orthogonal to the optical axis-direction in addition to the optical axis-direction is shown as an example. In this case, for example, selecting the third sensor element 83a for the magnetic sensor 80a, the fourth sensor element 84b for the magnetic sensor 80b, the first sensor element 81c for the magnetic sensor 80c, and the second sensor element 82b for the magnetic sensor 80d enables their distances from the magnet in the direction orthogonal to the optical axis-direction to be adjusted and the effect of the implementation error to be reduced.

Note that in the foregoing description, the implementation error in the direction orthogonal to the optical axis-direction is shown as one example, but the plurality of magnetic sensors 80a-d may have implementation errors in the optical axis-direction as well. In other words, the plurality of magnetic sensors 80a-d should be arranged at a regular interval along the optical axis-direction but may be implemented at different interval in the optical axis-direction due to implementation errors. Even in such a case, selecting optimal sensor elements in each of the plurality of magnetic sensors 80a-d enables the effect of implementation errors to be reduced. In this way, the calibration apparatus 100 can reduce the gap between outputs of a plurality of ICs arranged together generated depending on the implementation errors.

In this manner, in the present variation, each of the plurality of magnetic sensors 80a-d may be composed of the sensor element group consisting of the plurality of sensor elements 81-84. The magnetic field acquisition unit 140 may acquire the magnetic field data from at least one sensor element of the plurality of sensor elements 81-84.

So far, a part of specific aspects in which the present invention ay be implemented has been illustrated, but the present invention may be deformed or applied in various aspects.

For example, a case where the position acquisition unit 120 acquires the measurement data of the position of the object 10 measured by the laser displacement meter as the position data is shown as one example in the foregoing description. However, it is not limited thereto. The position acquisition unit 120 may acquire magnetic field generated when the object 10 moves as the position data. If the variation in the magnetic field data involved with the move of the object 10 is already known, the position acquisition unit 120 may acquire the magnetic field data as the position data.

In this case, when the magnitude of the magnetic field generated when the object 10 moves exceeds a prestored threshold the switch decision unit 130 may decide that the object has moved to the opposite end in each section. Alternatively, or additionally, the switch decision unit 130 may decide that the object 10 has moved to the opposite end in each section when the magnitude of a differential value of the magnetic field generated when the object 10 moves is below a prestored threshold (that is, when the variation in the magnetic field has saturated). For example, in this manner, the switch decision unit 130 can decide that the object 10 has moved to the opposite end when the position data exceeds a prestored standard. In this manner, the position acquisition unit 120 can acquire, as the position data, at least one of measurement data of a measured position of the object 10 or a magnetic field generated when the object 10 moves.

The present invention may be described by referring to flowcharts and block diagrams, wherein blocks may represent (1) steps of processes in which operations are performed or (2) sections of apparatuses responsible for performing operations. Certain steps and sections may be implemented by dedicated circuitry, programmable circuitry supplied with computer readable instructions stored on a computer readable storage medium, and/or processors supplied with computer readable instructions stored on a computer readable storage medium. Dedicated circuitry may include digital and/or analog hardware circuits and may include integrated circuits (IC) and/or discrete circuits. For example, programmable circuitry may include reconfigurable hardware circuits including logical AND, OR, XOR, NAND, NOR, and other logical operations, flip-flops, registers, and memory elements, such as field-programmable gate arrays (FPGA), programmable logic arrays (PLA), etc.

A computer readable storage medium may include any tangible device that can store instructions for execution by a suitable device, such that the computer readable storage medium having instructions stored therein comprises an article of manufacture including instructions which can be executed to create means for performing operations specified in the flowcharts or block diagrams. Examples of the computer readable storage medium may include an electronic storage medium, a magnetic storage medium, an optical storage medium, an electromagnetic storage medium, a semiconductor storage medium, etc. More detailed examples of the computer readable storage medium may include a floppy (registered trademark) disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY (registered trademark) disc, a memory stick, an integrated circuit card, etc.

Computer readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk (registered trademark), JAVA (registered trademark), C++, etc., and conventional procedural programming languages, such as the "C" programming language or similar programming languages.

Computer readable instructions may be provided to a processor of a general purpose computer, special purpose computer, or other programmable data processing apparatus, or to programmable circuitry, locally or via a local area network (LAN), wide area network (WAN) such as the Internet, etc., so that the processor of the general purpose computer, special purpose computer, or other programmable data processing apparatus, or the programmable circuitry executes the computer readable instructions to create means for performing operations specified in the flowcharts or block diagrams. Examples of processors include computer processors, processing units, microprocessors, digital signal processors, controllers, microcontrollers, etc.

Figure 14:
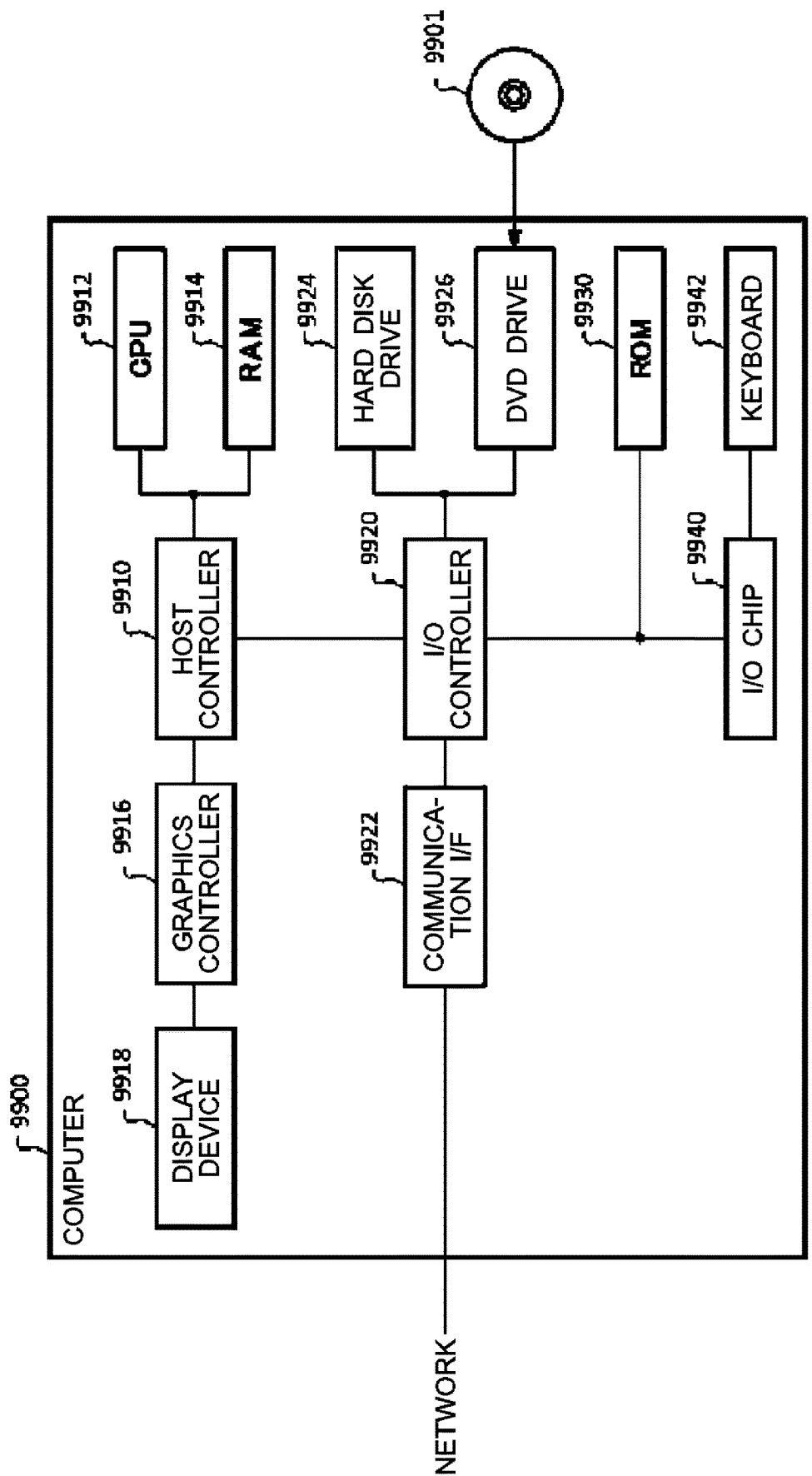
FIG. 14 shows an example of a computer 9900 where a plurality of aspects of the present invention may be entirely or partially embodied.

FIG. 14 shows an example of a computer 9900 where a plurality of aspects of the present invention may be entirely or partially embodied. A program that is installed in the computer 9900 can cause the computer 9900 to function as or execute operations associated with the apparatus of the embodiment of the present invention or one or more sections of the apparatus, and/or cause the computer 9900 to execute the processes of the embodiment of the present invention or steps thereof. Such a program may be executed by a CPU 9912 so as to cause the computer 9900 to execute certain operations associated with some or all of the flowcharts and the blocks in the block diagrams described herein.

The computer 9900 according to the present embodiment includes the CPU 9912, a RAM 9914, a graphics controller 9916 and a display device 9918, which are mutually connected by a host controller 9910. The computer 9900 further includes input/output units such as a communication interface 9922, a hard disk drive 9924, a DVD drive 9926 and an IC card drive, which are connected to the host controller 9910 via an input/output controller 9920. The computer also includes legacy input/output units such as a ROM 9930 and a keyboard 9942, which are connected to the input/output controller 9920 via an input/output chip 9940.

The CPU 9912 operates according to programs stored in the ROM 9930 and the RAM 9914, thereby controlling each unit. The graphics controller 9916 acquires image data generated by the CPU 9912 on a frame buffer or the like provided in the RAM 9914 or in itself, and to cause the image data to be displayed on the display device 9918.

The communication interface 9922 communicates with other electronic devices via a network. The hard disk drive 9924 stores programs and data that are used by the CPU 9912 within the computer 9900. The DVD drive 9926 reads programs or data from a DVD-ROM 9901, and to provide the hard disk drive 9924 with the programs or data via the RAM 9914. The IC card drive reads programs and data from an IC card, and/or writes programs and data into the IC card.

The ROM 9930 stores therein a boot program or the like executed by the computer 9900 at the time of activation, and/or a program depending on the hardware of the computer 9900. The input/output chip 9940 may also connect various input/output units via a parallel port, a serial port, a keyboard port, a mouse port or the like to the input/output controller 9920.

A program is provided by a computer readable storage medium such as the DVD-ROM 9901 or the IC card. The program is read from the computer readable storage medium, installed into the hard disk drive 9924, RAM 9914, ROM 9930, which are also examples of a computer readable storage medium, and executed by CPU 9912. The information processing described in these programs is read into the computer 9900, resulting in cooperation between a program and the above-mentioned various types of hardware resources. An apparatus or method may be constituted by realizing the operation or processing of information in accordance with the usage of the computer 9900.

For example, when communication is performed between the computer 9900 and an external device, the CPU 9912 may execute a communication program loaded onto the RAM 9914 to instruct communication processing to the communication interface 9922, based on the processing described in the communication program. The communication interface 9922, under control of the CPU 9912, reads transmission data stored on a transmission buffer region provided in a recording medium such as the RAM 9914, the hard disk drive 9924, DVD-ROM 9901, or the IC card, and transmits the read transmission data to a network or writes reception data received from a network to a reception buffer region or the like provided on the recording medium.

Also the CPU 9912 may cause all or a necessary portion of a file or a database to be read into the RAM 9914, wherein the file or the database has been stored in an external recording medium such as the hard disk drive 9924, the DVD drive 9926 (DVD-ROM 9901), the IC card, etc., and perform various types of processing on the data on the RAM 9914. The CPU 9912 then writes back the processed data to the external recording medium.

Various types of information, such as various types of programs, data, tables, and databases, may be stored in the recording medium to undergo information processing. The CPU 9912 may perform various types of processing on the data read from the RAM 9914, which includes various types of operations, information processing, condition judging, conditional branch, unconditional branch, search/replacement of information, etc., as described throughout this disclosure and designated by an instruction sequence of programs, and writes the result back to the RAM 9914. Also the CPU 9912 may search for information in a file, a database, etc., in the recording medium. For example, when a plurality of entries, each having an attribute value of a first attribute associated with an attribute value of a second attribute, are stored in the recording medium, the CPU 9912 may search for an entry whose attribute value of the first attribute matches the condition a designated condition, from among the plurality of entries, and read the attribute value of the second attribute stored in the entry, thereby obtaining the attribute value of the second attribute associated with the first attribute satisfying the predetermined condition.

The above described program or software modules may be stored in the computer readable storage medium on or near the computer 9900. Also a recording medium such as a hard disk or a RAM provided in a server system connected to a dedicated communication network or the Internet can be used as the computer readable storage medium, thereby providing the program to the computer 9900 via the network.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10: object
20: lens
30: magnet
50: drive apparatus
60: drive unit
70: magnetic field detection unit
80: magnetic sensor
81: first sensor element
82: second sensor element
83: third sensor element
84: fourth sensor element
100: calibration apparatus
110: driving control unit
120: position acquisition unit
130: switch decision unit
140: magnetic field acquisition unit
150: generating unit
200: drive coil
210: driver
220: position command unit
230: differential amplifier
240: switch
250: first buffer
260: second buffer
270: first output driver
280: second output driver
1100: adjustment unit
9900: computer
9901: DVD-ROM
9910: host controller
9912 CPU
9914: RAM
9916: graphics controller
9918: display device
9920: input/output controller
9922: communication interface
9924: hard disk drive
9926: DVD drive
9930: ROM
9940: input/output chip
9942: keyboard

What is claimed is:

1. A calibration apparatus comprising:
a driving control unit configured to drive an object provided with a lens in a movable range for moving the object in an optical axis-direction by sequentially controlling a plurality of drive units configured to drive the object within each of a plurality of sections into which the movable range is divided, in calibration of a drive apparatus including: the plurality of drive units; and a magnetic field detection unit configured to detect a magnetic field corresponding to a position of the object;
a position acquisition unit configured to acquire position data indicating data regarding a position of the object;
a magnetic field acquisition unit configured to acquire magnetic field data indicating a magnetic field corresponding to a position of the object; and
a generating unit configured to generate, based on the position data and the magnetic field data, end point information indicating a value of the magnetic field data when the object is located at each of end points of the plurality of sections, to determine a driving range in each of the plurality of sections by using the end point information.

2. The calibration apparatus according to claim 1, wherein the driving control unit is configured to control, in accordance with a position of the object, one drive unit responsible for a section in which the object is located among the plurality of drive units as a control target.

3. The calibration apparatus according to claim 2, further comprising a switch decision unit configured to decide a switch of the control target based on the position data, wherein
the driving control unit is configured to switch the control target based on a decision result of the switch decision unit.

4. The calibration apparatus according to claim 3, wherein the switch decision unit is configured to decide a switch of the control target to a drive unit responsible for a next section when the object moved from an end to an opposite end in each section.

5. The calibration apparatus according to claim 4, wherein the switch decision unit is configured to decide that the object has moved to the opposite end when the position data exceeds a prestored standard.

6. The calibration apparatus according to claim 4, wherein the magnetic field detection unit includes a plurality of magnetic sensors each of which is associated with one of the plurality of drive units, and
the magnetic field acquisition unit is configured to acquire the magnetic field data from a magnetic sensor associated with the drive unit having become the control target.

7. The calibration apparatus according to claim 5, wherein the magnetic field detection unit includes a plurality of magnetic sensors each of which is associated with one of the plurality of drive units, and
the magnetic field acquisition unit is configured to acquire the magnetic field data from a magnetic sensor associated with the drive unit having become the control target.

8. The calibration apparatus according to claim 6, wherein the magnetic field acquisition unit is configured to acquire the magnetic field data further from a magnetic sensor associated with the drive unit responsible for the next section.

9. The calibration apparatus according to claim 6, wherein
   each of the plurality of magnetic sensors is composed of a sensor element group consisting of a plurality of sensor elements, and
   the magnetic field acquisition unit is configured to acquire the magnetic field data from at least one sensor element of the plurality of sensor elements.

10. The calibration apparatus according to claim 9, wherein each of the plurality of sensor elements is arranged out of alignment with each other in an optical axis-direction and a direction crossing with the optical axis-direction.

11. The calibration apparatus according to claim 1, wherein the generating unit is configured to generate the end point information by using a regression analysis using the position data and the magnetic field data.

12. The calibration apparatus according to claim 1, wherein the position acquisition unit is configured to acquire, as the position data, at least one of measurement data of a measured position of the object or a magnetic field generated when the object moves.

13. The calibration apparatus according to claim 1, further comprising the drive apparatus.

14. The calibration apparatus according to claim 13, wherein
   each of the plurality of drive units includes: a drive coil configured to drive a magnet provided for the object; and a driver configured to supply a drive current to the drive coil, and
   the driving control unit is configured to control the drive current to be supplied from the driver to the drive coil.

15. The calibration apparatus according to claim 14, wherein the driver is configured to be capable of inverting a direction of the drive current to be supplied to the drive coil in response to a control command from the driving control unit.

16. The calibration apparatus according to claim 15, wherein the driving control unit is configured to gradually increase a magnitude of the drive current when the driving control unit causes the object to move from an end to an opposite end in each section.

17. The calibration apparatus according to claim 15, wherein the driving control unit is configured to gradually decrease a magnitude of the drive current when the driving control unit causes the object to move from an end to an opposite end in each section.

18. The calibration apparatus according to claim 1, further comprising an adjustment unit configured to adjust the end point information in response to feedback control having been performed based on the magnetic field data.

19. A calibration method comprising:
   driving an object provided with a lens in a movable range for moving the object in an optical axis-direction by sequentially controlling a plurality of drive units configured to drive the object within each of a plurality of sections into which the movable range is divided, in calibration of a drive apparatus including: the plurality of drive units; and a magnetic field detection unit configured to detect a magnetic field corresponding to a position of the object;
   acquiring position data indicating data regarding a position of the object;
   acquiring magnetic field data indicating a magnetic field corresponding to a position of the object; and
   generating, based on the position data and the magnetic field data, end point information indicating a value of the magnetic field data when the object is located at each of end points of the plurality of sections, to determine a driving range in each of the plurality of sections by using the end point information.

20. A non-transitory recording medium having recorded thereon a calibration program, executed by a computer, for causing the computer to function as:
   a driving control unit configured to drive an object provided with a lens in a movable range for moving the object in an optical axis-direction by sequentially controlling a plurality of drive units configured to drive the object within each of a plurality of sections into which the movable range is divided, in calibration of a drive apparatus including: the plurality of drive units; and a magnetic field detection unit configured to detect a magnetic field corresponding to a position of the object;
   a position acquisition unit configured to acquire position data indicating data regarding a position of the object;
   a magnetic field acquisition unit configured to acquire magnetic field data indicating a magnetic field corresponding to a position of the object; and
   a generating unit configured to generate, based on the position data and the magnetic field data, end point information indicating a value of the magnetic field data when the object is located at each of end points of the plurality of sections, to determine a driving range in each of the plurality of sections by using the end point information.

* * * * *